United States Patent [19]

Daponte

[11] Patent Number: 4,863,779
[45] Date of Patent: Sep. 5, 1989

[54] COMPOSITE ELASTOMERIC MATERIAL
[75] Inventor: Diego H. Daponte, Woodstock, Ga.
[73] Assignee: Kimberly-Clark Corporation, Neenah, Wis.
[21] Appl. No.: 25,770
[22] Filed: Mar. 13, 1987

Related U.S. Application Data

[63] Continuation-in-part of Ser. No. 843,428, Mar. 24, 1986, abandoned.
[51] Int. Cl.⁴ .................................................. D06N 7/04
[52] U.S. Cl. ........................ 428/152; 428/198; 428/284; 428/286; 428/287; 428/297; 428/298; 428/340; 428/903
[58] Field of Search ............... 428/152, 198, 284, 286, 428/287, 297, 298, 340, 903

[56] References Cited

U.S. PATENT DOCUMENTS

| | | | |
|---|---|---|---|
| 1,544,312 | 6/1925 | Gray | 425/177 |
| 2,030,746 | 2/1936 | Galligan | 154/2 |
| 2,125,495 | 8/1938 | French | 156/163 |
| 2,343,374 | 3/1944 | Hargreaves | 2/237 |
| 2,905,581 | 9/1959 | Maxey | 156/163 |
| 2,957,512 | 10/1960 | Wade | 428/284 |
| 3,316,136 | 4/1967 | Pufahl | 156/160 |
| 3,468,748 | 9/1969 | Bassett | 161/122 |
| 3,644,157 | 2/1972 | Draper | 156/160 |
| 3,673,026 | 6/1972 | Brown | 156/164 |
| 3,687,797 | 8/1972 | Wideman | 161/129 |
| 3,694,815 | 10/1972 | Burger | 267/210 |
| 3,828,367 | 8/1974 | Bourgeois | 156/160 |
| 3,842,832 | 10/1974 | Wideman | 128/169 |
| 3,849,241 | 11/1974 | Butin | 428/296 |
| 3,868,729 | 3/1975 | Lynam | 161/50 |
| 3,873,403 | 3/1975 | Edelman | 66/170 |
| 3,959,421 | 3/1976 | Weber | 264/6 |
| 4,081,301 | 3/1978 | Buell | 156/164 |
| 4,100,324 | 7/1978 | Anderson | 428/288 |
| 4,181,762 | 1/1980 | Benedyk | 428/97 |
| 4,209,563 | 6/1980 | Sisson | 428/288 |
| 4,259,220 | 3/1981 | Bunnelle | 525/98 |
| 4,297,157 | 10/1981 | Van Vliet | 156/163 |
| 4,305,990 | 12/1981 | Kelly | 428/220 |
| 4,340,563 | 7/1982 | Appel | 264/518 |
| 4,375,446 | 3/1983 | Fujii | 264/518 |
| 4,397,645 | 8/1983 | Buell | 604/380 |
| 4,413,623 | 11/1983 | Pieniak | 428/230 |
| 4,434,205 | 2/1984 | Fujii | 428/284 |
| 4,450,026 | 5/1984 | Pieniak | 156/191 |
| 4,476,180 | 10/1984 | Wnuk | 428/220 |
| 4,508,113 | 4/1984 | Malaney | 428/286 |
| 4,525,407 | 6/1985 | Ness | 428/198 |
| 4,543,099 | 9/1985 | Bunnelle | 428/906 |
| 4,552,603 | 11/1985 | Harris | 428/296 |
| 4,555,811 | 12/1985 | Shimalla | 428/287 |
| 4,588,630 | 5/1986 | Shimalla | 428/131 |
| 4,720,415 | 1/1988 | Vander Wielen et al. | 428/152 |

FOREIGN PATENT DOCUMENTS

2260716 5/1974 Fed. Rep. of Germany .

OTHER PUBLICATIONS

"A System Approach to Nonwovens Production" by W. John McCulloch and F. J. Steinlinger—Pages 7 and 13.
Shell Chemical Company Technical Bulletin SC:198-83, pp. 1-6, 9-20.
Shell Chemical Company Technical Bulletin SC:165-77, pp. 1-6.

*Primary Examiner*—James J. Bell
*Attorney, Agent, or Firm*—Karl V. Sidor

[57] ABSTRACT

Describes improved composite material comprising an elastic web preferably formed of collected, entangled, nonwoven fibers comprising a copolymer made of ethylene and at least one other vinyl monomer selected from the group including vinyl ester monomers and unsaturated aliphatic monocarboxylic acids and alkyl esters of these monocarboxylic acids, where the amount of monomer other than the ethylene in the copolymer is sufficient to impart elasticity to a cohesive nonwoven web formed from melt-blown fibers of the material. This elastic web is bonded to at least one other web, and preferably is interrelated between two other nonwoven webs of spun-bonded or melt-blown fibers. Discloses processes of making these composite materials. The composites are useful for protective covers and wraps, outerwear, undergarments, menstrual and incontinence control articles, and garments such as disposable diapers and the like.

74 Claims, 2 Drawing Sheets

COMPOSITE ELASTOMERIC MATERIAL

This application is a continuation in part of Ser. No. 06/843,428, now abandoned.

FIELD OF THE INVENTION

The present invention is concerned with a cloth-like material that is formed from a particular kind of laminate, methods of making it, and articles that can be made from it. In one embodiment, this laminate is a composite comprising at least one elastic web, such as a nonwoven cohesive web of elastomeric fibers, bonded to one or more webs of a nonwoven, nonelastic cohesive material. The composites of the invention may be made in the form of soft, cloth-like materials that may be superior to prior art materials with respect to drape, strength, and stretch.

BACKGROUND OF THE INVENTION

A suggestion for using a nonwoven web in a laminate is found in the Butin U.S. Pat. No. 3,849,241. The nonwoven web was formed of a melt-blown thermoplastic polymer such as polypropylene.

Composite fabrics comprising at least one layer of nonwoven textile fabric secured to an elastic layer are known. For example, the presently pending, commonly assigned U.S. patent application Ser. No. 760,437, filed July 30, 1985, of J. D. Taylor and M. J. Vander Wielen, for "Composite Elastomeric Material and Process for Making the Same", discloses composite elastomeric material in which at least one elastic web is bonded to at least one gatherable web. The gatherable web must be extensible and contractable with the elastic web upon stretching and relaxing of the composite material. The composite is made by tensioning the elastic web to elongate it, bonding the elongated elastic web to at least one gatherable web under conditions that soften one or both webs so that they bond to each other, and then relaxing the composite web immediately after the bonding step. Relaxation is accompanied by contraction of the elastic web, and since the gatherable web and elastic web are bonded together, the gatherable web is gathered.

Composites made in accordance with the Taylor and Vander Wielen disclosure have great utility for a number of consumer and industrial applications. For example, a disposable cover for the head of a mop may be fabricated from the composite. Such a cover may be made up so that it must be stretched to place it over a mop head, but when relaxed, will be self-retaining on the mop head because of its relaxation to a size that holds it in place over the inserted mop head. These composites are also useful in fabricating stretchable protective covers and wraps, outerwear, undergarments, and menstrual and incontinence control articles and garments, such as disposable diapers and the like. The mop head cover is disclosed in the copending, commonly assigned application of L. L. Gibbs and C. J. Morell.

The applications of Taylor and Vander Wielen, and of Gibbs and Morell, are incorporated herein by reference.

While the Taylor and Vander Wielen composites are self-bonded nonwoven webs that are bonded to each other by the partial melting and subsequent cooling of at least one of the webs while in contact with the other, composite fabrics comprising at least one layer of nonwoven textile fabric secured to an elastic layer by mechanical means are also known.

U.S. Pat. No. 4,209,563 discloses a method of making an elastic material which includes continuously forwarding relatively elastomeric fibers and elongatable but relatively nonelastic fibers onto a forming surface and bonding at least some of the fiber crossings to form a coherent cloth which is subsequently mechanically worked, as by stretching, following which it is allowed to relax. As described by the patentee at column 8, lines 19 et seq., the elastic modulus of the cloth is substantially reduced after the stretching, resulting in the permanently stretched nonelastic filaments relaxing and looping to increase the bulk and improve the feel of the fabric (column 9, lines 9–14 and FIG. 3). Forwarding of the filaments to the forming surface is positively controlled, which the patentee (column 7, lines 19 et seq.) contrasts to the use of air streams to convey the fibers as used in melt-blowing operations. Bonding of the filaments to form the coherent cloth may utilize embossing patterns or smooth, heated roll nips, as set forth at column 9, lines 44 et seq.

U.S. Pat. No. 3,316,136 discloses a composite fabric comprising a layer of an elastic or resilient material and an overlaying layer of fabric, for example, a woven fabric. The elastic fabric may be a polyurethane foam or a nylon woven to impart stretchability or the like and, as is disclosed in the paragraph bridging columns 1 and 2 of the patent, an adhesive may be applied in a predetermined pattern to the elastic material which is then stretched, and while in a stretched or elongated state, the overlying fabric is contacted therewith and held in pressure engagement for a time sufficient to ensure adhesion of the two layers. When the applied adhesive is dry, tension on the backing material is released, causing the overlying nonelastic fabric to gather in the areas outlined by the adhesive.

U.S. Pat. No. 2,957,512 concerns a method of producing elastic composite sheet materials and discloses that a reticulated, fibrous web formed of an elastomeric material such as rubber, including butadiene-styrene copolymers, may be utilized as the elastic ply of a composite material as disclosed at column 3, lines 18–24. At column 5, lines 39–48, the patent discloses, with reference to FIG. 7 of the drawings, that a relaxed sheet material ply may have a fibrous web of elastomeric material of smaller area than the sheet material stretched so as to conform it in area to the area of the sheet material and the plies bonded together at spaced points or areas. Upon allowing the fibrous elastomeric ply to relax, the composite body is stated to assume the structure shown in FIG. 7, which is described at column 5, lines 15 et seq., as showing a fibrous web of elastomeric material 50 bonded at spaced areas or lines 56 to a ply 55 of a creped or corrugated flexible sheet material, which may be paper or a synthetic resin material. The structures of the patented invention are stated to be particularly well-suited for the manufacture of foundation garments, bathing garments, elastic stocking, ankle braces, belts, garters, galluses and the like.

SUMMARY OF THE INVENTION

This invention is concerned with a soft, cloth-like material that is suitable as a bodyside cover for diapers, health care garments and materials, tissue, and a variety of industrial products. This material is a composite or laminate of a pair of webs, and preferably both of these webs are nonwoven. To develop the desirable characteristics of the laminate of the invention, one of these nonwoven webs is formed from melt-blown microfibers of an ethylene-vinyl acetate copolymer, as hereinafter described in greater detail. The other layer is formed from either spun-bonded or melt-blown fibers, preferably of polypropylene, polyethylene, or a random copolymer of ethylene and propylene.

For some purposes, a trilaminate is preferred. In the trilaminate embodiment of the invention, the nonwoven web that is formed from poly(ethylene-vinyl acetate) microfibers is the intercalary layer. The outer layers are both formed of nonwoven webs and may be the same or different. For example, one of the outer layers may be formed of a nonwoven web of spun-bonded or melt-blown polypropylene fibers, and the other may be formed from spun-bonded or melt-blown polyethylene fibers. Such a product represents one preferred embodiment of the invention, and offers different properties on each of its faces. Thus, the cover layer that is formed from spun-bonded or melt-blown polyethylene fibers generally provides greater softness, and thus might be more attractive and useful as a surface intended for body contact.

In both the dilaminate and trilaminate embodiments, the laminae are heat-bonded together. This is ordinarily accomplished simply by passing the laminae between rolls, either one or both of which are heated sufficiently to soften at least one of the laminae sufficiently to become adhesive in nature. The pressure applied by the rolls is then sufficient to press them together to permit the laminae to become bonded to each other.

The intercalary layer may be formed from fibers consisting entirely of poly(ethylene-vinyl acetate). Nonwoven webs of this type have superior elasticity and are preferred for many applications. Where a less elastic intercalary layer is desired, it may be formed from a nonwoven web made from a blend of a poly(ethylene-vinyl acetate) with a modifying polymer such as, for example, a polyolefin or a mixture of polyolefins, or a similar polymer formed from one or more monomers having olefinic unsaturation.

Composites made in accordance with the invention can be formed to be very cloth-like, and to be superior in terms of drape, softness, strength, and stretch, to currently known composites made from other nonwoven materials such as, for example, polyethylene or polypropylene webs formed from spun-bonded or melt-blown fibers.

While the preferred intercalary layer is formed from microfibers of melt-blown poly(ethylene-vinyl acetate) having a melt index in the range from 31 to 500 at 190° C. and comprising from 10% by weight to about 50% by weight of vinyl acetate, the invention also encompasses laminates made from nonwoven webs formed from melt-blown fibers where the copolymer is made of ethylene and at least one other vinyl monomer that is selected from the group including vinyl ester monomers and unsaturated aliphatic monocarboxylic acids and alkyl esters of these monocarboxylic acids, wherein the amount of monomer other than ethylene in the copolymer is sufficient to impart elasticity to a cohesive nonwoven web formed from these melt-blown fibers.

In accordance with one particular embodiment of the present invention, there is provided a method of producing a composite elastic material comprising at least one gatherable web bonded to at least one elastic web, that is, a nonwoven web formed from melt-blown fibers comprising a copolymer made of ethylene and at least one other vinyl monomer selected from the group including vinyl ester monomers and unsaturated aliphatic monocarboxylic acids and alkyl esters of these monocarboxylic acids, wherein the amount of monomer other than ethylene in the copolymer is sufficient to impart elasticity to a cohesive nonwoven web formed from said melt-blown fibers. The method of uniting these webs is that disclosed in the Taylor and Vander Wielen patent application, although other materials were disclosed as useful in that patent application.

The method of uniting these webs comprises (a) tensioning the elastic web, such as a nonwoven cohesive web of elastomeric fibers, to elongate it; (b) bonding the elongated elastic web to at least one gatherable web under conditions which soften at least portions of the elastic web to form a bonded composite web; and (c) relaxing the composite web immediately after the bonding step, so that the gatherable web is gathered to form a composite elastic material having gathered web material on at least one surface thereof.

Generally, the bonding step involves overlaying the stretched elastic web and the gatherable web or webs, and applying heat and pressure. For example, bonding may often may be effected by heating bonding sites on the elastic web to temperatures in the range from at least about 65° C. to about 120° C., and preferably from at least about 70° C. to about 90° C.

Preferably, the elastic web is bonded to the gatherable web or webs at a plurality of spaced-apart locations in a repeating pattern, so that the gatherable web is gathered between these locations.

In another aspect, the present invention provides an improved composite material comprising an elastic web of the materials previously described, bonded to at least one gatherable web in such fashion that the gatherable web is extensible and contractable with the elastic web upon stretching and relaxing of the composite material, the composite being made in the fashion described above.

Other aspects of the invention provide that the elastic web may comprise a nonwoven web of elastomeric fibers of the composition already described, preferably elastomeric microfibers such as, for example, an elastomeric nonwoven web of melt-blown elastomeric fibers or an elastomeric film.

In a preferred embodiment of the invention, the elastic web is formed from fibers of a copolymer of ethylene and vinyl acetate having a melt index in the range from 32 to 500, or preferably 32 to 300, at 190° C. and comprising from 10% by weight to about 50% by weight of vinyl acetate, preferably 18% by weight to 36% by weight. Particularly if this material is melt-blown to form microfibers that in turn are formed into a cohesive nonwoven web, the web that is formed has very good characteristics in terms of drape, elasticity, and cloth-like appearance.

One important characteristic of nonwoven webs formed from microfibers of poly(ethylene-vinyl acetate) is their ability to be heat-bonded to other webs. Since poly(ethylene-vinyl acetate) has a melting point in the range from about 45° C. to about 115° C., depending upon its particular composition, it has the ability to become tacky when heated to temperatures within this range, which are readily attainable simply by passing the nonwoven web, together with one or more webs to which it is to become bonded, through a heated calender roll-anvil roll pair. This characteristic of the nonwoven web of poly(ethylene-vinyl acetate) is important whether the laminate being formed is a simple dilaminate or trilaminate, or whether the laminate being formed is a composite where the intercalary layer is stretched before being bonded to the cover sheet or sheets.

In order to develop particular properties in the intercalary layer, it is possible to add to the poly(ethylene-vinyl acetate) a modifying polymer prior to melt-blowing. This is done simply by mixing pellets of the two or more resins together to form a uniform blend of pellets. The modifying polymer must be one which, when blended with the poly(ethylene-vinyl acetate), and subjected to an effective combination of elevated temperature and elevated pressure conditions, is adapted to be extruded in blended form to form staple, homogeneous fiber or microfibers of the blend.

Suitable modifying polymers may be selected from the group consisting of polyethylene, polypropylene, polybutene, polystyrene, copolymers and mixtures of these, and an A—B—A' block copolymer, where A and A' are each a thermoplastic polymer endblock that includes a styrenic moiety and where B is an elastomeric poly(ethylene-butene) midblock.

The elastomeric fibers that form the elastomeric nonwoven web, preferably melt-blown microfibers, are composed of at least 10% by weight, preferably at least 20% by weight, and even more preferably at least 30% by weight, up to 100% by weight of the copolymer made of ethylene and vinyl acetate. When used, the modifying polymer or polymers may be present in an extrudable blend of resins in an amount greater than 0% by weight and up to a maximum of about 90% by weight of the modifying polymer, based on the weight of the elastic web.

To make the gathered composite of the invention, the fibrous elastic web is bonded to the gatherable web at a plurality of spaced-apart locations in a repeating pattern, and the gatherable web is gathered, in the composite, between these bonded locations.

The elastic web preferably has a low basis weight of from about 15 to about 300 grams per square meter, preferably from about 15 to about 200 grams per square meter, and even more preferably from about 15 to about 100 grams per square meter. The basis weight can be much higher, depending upon the intended application.

The cover web or webs, whether gatherable or not, may be nonwoven, nonelastic material. Preferably, each cover web is composed of fibers formed from materials selected from the group consisting of polyester fibers such as poly(ethylene terephthalate) fibers, polyolefin fibers, and polyamide fibers such as nylon fibers, cellulosic fibers, cotton fibers, and mixtures thereof. Alternatively, the cover web may be any suitable woven fabric. Preferably, however, the cover webs are formed from spun-bonded or melt-blown fibers of polyethylene, polypropylene, or a random copolymer of ethylene and propylene.

In addition, the coforming process may be used to incorporate a secondary fiber in the melt-blown microfibers of the elastic web and of the fibers of each cover sheet, if desired. Thus, wood pulp fibers may be incorporated in the melt-blown fibers of poly(ethylene-vinyl acetate), to create fibers of high absorbency value.

Other aspects of the invention are described in the description of the preferred embodiments.

DEFINITIONS

The term "copolymer" without any preceding modifying term, is used herein as a form of abbreviation. It refers to a copolymer made of ethylene and at least one other vinyl monomer selected from the group consisting of vinyl ester monomers, and unsaturated aliphatic monocarboxylic acids and alkyl esters of said monocarboxylic acids. For the practice of the present invention the preferred copolymer is a copolymer of ethylene and vinyl acetate having a melt index in the range from 32 to 500, or preferably 32 to about 300, at 190° C. and comprising from 10% by weight to about 50% by weight of vinyl acetate, preferably 18% by weight to 36% by weight, and more preferably 26% by weight to 30% by weight. Other copolymer materials that have been proposed as suitable for use in the practice of the invention include ethylene-acrylic acid copolymer, ethylene-methacrylic acid copolymer, ethylene-ethyl acrylic acid copolymer, ethylene-ethyl acrylate copolymer, ethylene-methyl acrylate copolymer, ethylene-ethyl methacrylate copolymer, ethylene-methyl methacrylate copolymer, and similar copolymer materials. In any of these materials, the amount of monomer contained besides ethylene is generally from about 10% to about 50% by weight of the copolymer. Copolymer materials of this type contribute pendent groups to the low density polyethylene backbone, and it has been observed that about 10% by weight of the component other than ethylene, if vinyl acetate, is needed to impart desired elastomeric properties to the products produced, and of course the amount would be expected to be higher for larger comonomer molecules.

The term "melt flow" as used herein is the amount (usually in grams per 10 minutes or decigrams per minute) of a material which can be forced through a given orifice under a specified pressure and at a given temperature. The value should be determined in accordance with ASTM D 1238. The term "melt index" refers to the value obtained in accordance with condition E of ASTM D 1238 (190° C. and 2,160 gram load) and modified as follows:

(1) If the melt index (MI) at condition E is less than 100 grams per 10 minutes the melt flow rate (MFR) in accordance with ASTM D 1238 at 125° C. and 2,160 gram load is determined and the reported melt index is determined by the following equation:

$$MI = 8.7 \times (MFR)^{0.917}$$

(2) If the melt index (MI) at condition E is greater than 100 grams per 10 minutes the melt flow rate (MFR) in accordance with ASTM D 1238 at 125° C. and 325 gram weight is determined and the reported melt index is determined by the following equation:

$$MI = 66.8 \times (MFR)^{0.83}$$

The term "modifying polymer" is employed to refer to a material that is added to the copolymer to modify the properties of the product. Preferred types of modifying polymer are those formed from monomers having olefinic unsaturation.

The term "compatible" is used to refer to the relationship of one polymeric material to another with respect to the extrusion process and extrudates. To be compatible, two different polymeric materials must have similar rheological behavior, they must form a homogeneous melt, and after being blown into fibers and solidifying, must form a homogeneous solid product.

The term "coforming" is well understood in the art. It is used to refer to the application of at least one secondary fibrous material to microfibers, to form a web of both types of fibers, in a coherent, integrated structure. U.S. Pat. No. 4,100,324 illustrates one kind of coforming process, and it is incorporated herein by reference.

The terms "elastic" and "elastomeric" are used interchangeably herein to mean that property of any material that, upon application of a biasing force, permits that material to be stretchable to a stretched, biased length which is at least about 125 percent, that is about one and one-quarter times, its relaxed, unbiased length, and that will cause the material to recover at least 40 percent of its elongation upon release of the stretching, elongating force. A hypothetical example which would satisfy this definition of an elastomeric material would be a one (1) inch sample of a material which is elongatable to at least 1.25 inches and which, upon being elongated to 1.25 inches and released, will recover to a length of not more than 1.15 inches. Many elastic materials may be stretched by much more than 25 percent of their relaxed length and many of these will recover to substantially their original relaxed length upon release of the stretching, elongating force. This latter class of materials is generally preferred for purpose of the present invention.

As used herein, the term "recover" relates to a contraction of a stretched material upon termination of a biasing force following stretching of the material by application of the biasing force. For example, if a material having a relaxed, unbiased length of one (1) inch were elongated 50% by stretching to a length of one and one-half (1.5) inches, the material would have been elongated 50% and would have a stretched length that is 150% of its relaxed length. If this exemplary stretched material contracted, that is, recovered to a length of one and one-tenth (1.1) inches after release of the biasing and stretching force, the material would have recovered 80 percent (0.4 inch) of its elongation.

The term "microfibers" is used herein to refer to small diameter fibers having an average diameter not greater than about 200 microns, preferably having diameters in the range from about 0.5 micron to about 50 microns, more preferably having an average diameter of from about 4 microns to about 40 microns. Microfibers may be melt-blown by extruding a molten thermoplastic material through a plurality of small diameter, usually circular die capillaries as molten threads and attenuating the molten threads by application of a high velocity gas, usually air, stream to reduce their diameters to be within the range stated above.

As used herein, the term "spun-bonded microfibers" refers to small diameter fibers having a diameter not greater than about 100 microns, preferably having a diameter of from about 10 microns to about 50 microns, more preferably having a diameter of from about 12 microns to about 30 microns, and which are made by extruding a molten thermoplastic material as filaments through a plurality of fine usually circular capillaries of a spinnerette with the diameter of the extruded filaments then being rapidly reduced as by, for example, eductive drawing or other well-known spun-bonding mechanisms. The product of spun-bonded nonwoven webs is illustrated in U.S. Pat. No. 4,340,563 to Appel, and the disclosure of this patent is hereby incorporated by reference.

As used herein, the term "nonwoven web" means a web of material which has been formed without the use of a weaving process. A nonwoven web has a structure of individual fibers or threads which are interlaid, but not in an identifiable, repeating manner. Nonwoven webs in the past have been formed by a variety of processes such as, for example, melt-blowing processes, spun-bonding processes, film aperturing processes, and staple fiber carding processes. These nonwoven webs generally have an average basis weight of not more than about 300 grams per square meter. Preferably, the nonwoven webs have an average basis weight of from about 15 grams per square meter to about 100 grams per square meter. More preferably, for many applications, the nonwoven webs have an average basis weight of from about 15 grams per square meter to about 75 grams per square meter.

Unless specifically set forth and defined or otherwise limited, the terms "polymer" or "polymer resin" as used herein generally include, but are not limited to, homopolymers, copolymers, such as, for example, block, graft, random and alternating copolymers, terpolymers, etc., and blends and modifications thereof. Furthermore, unless otherwise specifically limited, the terms "polymer" or "polymer resin" shall include all possible geometrical, i.e., stereo, configurations of the material. These configurations include, but are not limited to, isotactic, syndiotactic and random symmetries.

As used herein, the term "consisting essentially of" does not exclude the presence of additional materials which do not significantly affect the elastic properties and characteristics of a given polymeric composition. Exemplary materials of this sort would include, without limitation, pigments, antioxidants, stabilizers, surfactants, waxes, flow promoters, solid solvents, particulates and materials added to enhance processability of the composition.

DESCRIPTION OF THE PREFERRED EMBODIMENTS

Figure 1:
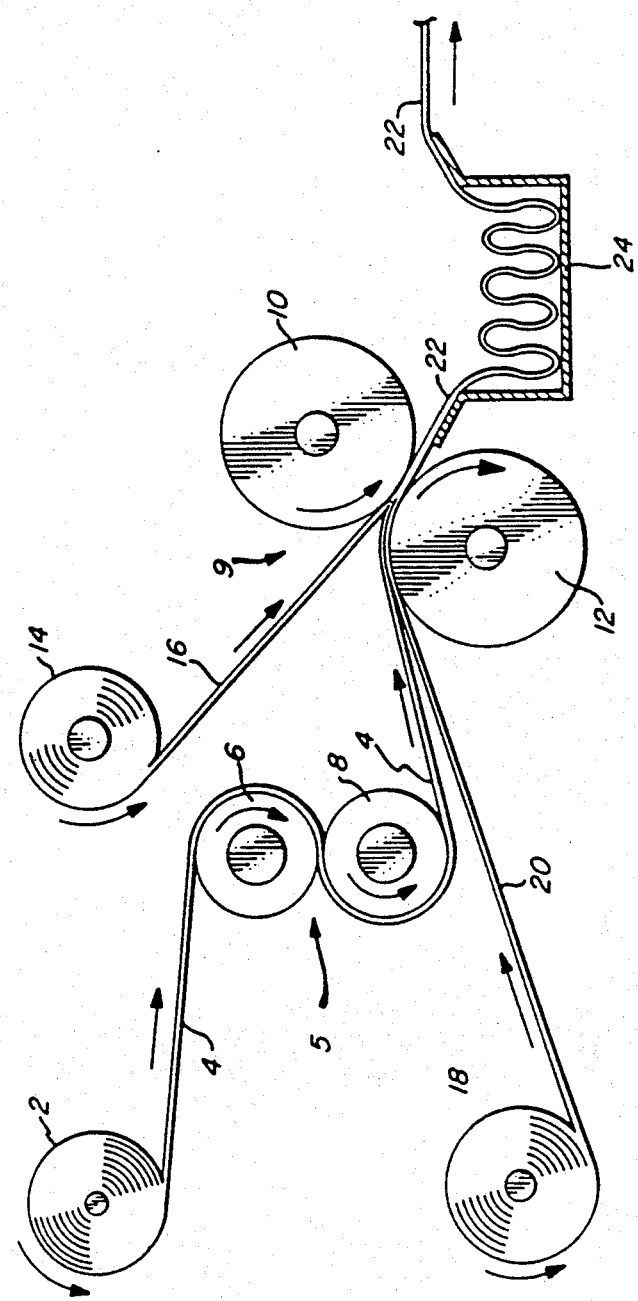
FIG. 1 is a schematic view in elevation illustrating one mode of carrying out the laminating process of the present invention, for that embodiment of the invention that is concerned with the production of a trilaminate composite where both face or cover webs are gathered in the composite product.

The composite elastic materials of the invention generally comprise at least one layer or web of elastic material comprising a copolymer, bonded to one or more other facing or cover layers of nonwoven material.

Elastic webs suitable for use in the invention include both elastic nonwoven fibrous webs such as, for example, melt-blown elastomeric fibrous webs. Such fibrous webs usually comprise microfibers. In fact, nonwoven webs of melt-blown microfibers constitute a preferred embodiment. The fibrous elastic web may also comprise a composite material in that it may be comprised of two or more individual coherent, self-bonded webs or it may comprise one or more webs that individually are elastic.

The coforming technique is one that is well-known in the trade. Coforming involves the incorporation of a secondary fiber into a primary fiber and the formation of a nonwoven web in which both fibers are substantially uniformly distributed. The secondary fiber may be incorporated in the web simply through mechanical entanglement, or the process may have been such that the secondary fibers were applied to the primary fibers while the primary fibers were tacky and adherent. In the latter case, the secondary fibers are bonded in place. In many cases, the secondary fibers will be held in place in the nonwoven web by a combination of adhesive bonding and mechanical entanglement.

One coforming technique is disclosed in U.S. Pat. No. 4,100,324 issued July 11, 1978 to Richard A. Anderson et al., and assigned to the assignee of this application. That patent discloses a nonwoven material comprised of a mixture of melt-blown thermoplastic and other fibers which are combined in the gas stream, in which the melt-blown fibers are borne so that an intimate, entangled co-mingling of thermoplastic melt-blown fibers and other fibers, e.g., wood pulp or staple natural or staple artificial fibers, occurs prior to collection of the fibers upon a collecting device to form a coherent web of randomly dispersed fibers. The disclosure of U.S. Pat. No. 4,100,324 is also incorporated by reference herein.

Broadly, the kind of resin that is useful and preferred for making melt-blown elastomeric fibers in accordance with the present invention that, upon collection as an entangled mass, form an elastomeric fibrous nonwoven web useful as the elastic web, is a copolymer of ethylene and at least one other vinyl monomer that is selected from the group consisting of vinyl ester monomers, unsaturated aliphatic monocarboxylic acids, and alkyl esters of such monocarboxylic acids, where the amount of monomer in the copolymer, other than the ethylene, is sufficient to impart elasticity to a cohesive nonwoven web formed from these melt-blown fibers.

Examples of such copolymer resins include copolymers of the following materials with ethylene, that can be melt-blown by being subjected to an effective combination of elevated temperature and elevated pressure conditions, and extruded to form microfibers that can be collected to form elastomeric nonwoven coherent webs. Among these are the copolymers of ethylene with: acrylic acid, vinyl acetate, ethyl acrylic acid, ethyl ethacrylate, methacrylic acid, methyl acrylate, ethyl acrylate, ethyl methacrylate, methyl methacrylate, and the like. The amount of the secondary monomer present should be, in percentages by weight based on the copolymer, at least 10% by weight, up to about 50% by weight of the secondary monomer. It is theorized that one of the functions of the secondary monomer is to provide side groups that are pendent from the polyethylene backbone, and that impart elasticity, perhaps by disrupting the otherwise crystalline nature of the polymer.

Other characterizing features of the secondary monomer and copolymer are also important, as will be illustrated with reference to the preferred embodiment, which is a copolymer of ethylene and vinyl acetate.

The preferred copolymer embodiment, that of ethylene and vinyl acetate, has a melt index in the range from 32 to 500, preferably 32 to 300, at 190° C., and comprises from 10% by weight to about 50%, preferably 18% by weight to 36% by weight, and more preferably 26% by weight to 30% by weight of vinyl acetate. Generally, as the content of vinyl acetate in the copolymer increases, the following characteristics of a nonwoven coherent web formed from copolymer microfibers increase: flexibility, toughness, adhesion, and what can be referred to as bondability or sealability, meaning the readiness with which the web can be heat-sealed to an adjacent web, as by calendering. As the melt index decreases, the viscosity during the melt-blowing process (which takes place at an elevated temperature) increases. Many other characteristics of the web can be expected to improve, however, as the melt index of the copolymer at 190° C. decreases, such as toughness, tear strength, and seal strength, referring again to the strength of a heat bond to an adjacent web or to itself.

Preferred elastic webs for use in the practice of the invention are generally those formed from melt-blown microfibers made from an extrudate consisting essentially of ethylene-vinyl acetate copolymer characterized by a melt index at 190° C. in the range from about 32 to about 300 and containing from about 18% by weight to about 30% by weight of vinyl acetate. However, for some applications where properties other than those exhibited by webs consisting essentially of ethylene-vinyl acetate microfibers are desired, a modifying polymer may be added to the copolymer resin to form a blend that is mixed to make it uniform, and then passed into the extruder during the melt-blowing process. Satisfactory blends are ordinarily achieved by simply mixing pellets of the copolymer with pellets of the modifying polymer, until a uniform mixture of pellets has been attained. Suitable modifying polymers include polyethylene, polypropylene, polybutene, polystyrene, copolymers and mixtures of these, and an A—B—A' block copolymer, where A and A' are each a thermoplastic polymer endblock that includes a styrenic moiety and where B is an elastomeric poly(ethylene-butene) midblock.

The preferred modifying polymers are the polyolefins, particularly polyethylene, polypropylene, random copolymers of ethylene and of propylene, and mixtures of polyethylene and polypropylene. However, the preferred polyolefin materials also include polybutene, and as well, ethylene copolymers, propylene copolymers, and butene copolymers. Blends of two or more of the polyolefins may be utilized.

A particularly preferred polyethylene for use as a modifying polymer is a linear low density (LLD) polyethylene sold by Exxon Chemical Company under the designation LPX 61. It has a density of about 0.930 gram per cubic centimeter measured in accordance with ASTM D 1505, a number average molecular weight (Mn) of about 10,500, a weight average molecular weight (Mw) of about 30,500, a Z average molecular weight (Mz) of about 62,000, and a polydispersity (Mw/Mn) of about 2.9.

Another commercial polyethylene resin that is expected to be suitable for use as the modifying polymer is obtainable from U.S.I. Chemical Company under the trade designation Petrothene Na601, also referred to as PE Na601 or Na601. Information obtained from U.S.I. Chemical Company states that the Na601 is a low molecular weight, low density polyethylene for application in the areas of hot-melt adhesives and coatings. U.S.I. has also stated that the Na601 has the following nominal values: (1) a Brookfield Viscosity, cP at 150° C. of 8,500 and at 190° C. of 3,300 when measured in accordance with ASTM D 3236; (2) a density of 0.903 gram per cubic centimeter when measured in accordance with ASTM D 1505; (3) an equivalent melt index of 2,000 grams per 10 minutes when measured in accordance with ASTM D 1238; (4) a ring and ball softening point of 102° C. when measured in accordance with ASTM E 28; (5) a tensile of 850 pounds per square inch when measured in accordance with ASTM D 638; (6) an elongation of 90% when measured in accordance with ASTM D 638; (7) a modulus of rigidity, $T_F$ (45,000) of $-34°$ C., and (8) a penetration hardness (tenths of mm) at 77° F. of 3.6.

Na601 polyethylene is believed to have a number average molecular weight (Mn) of about 4,600; a weight average molecular weight (Mw) of about 22,400 and a Z average molecular weight (Mz) of about 83,300. The polydispersity (Mw/Mn) of the Na601 is about 4.87.

A preferred polypropylene for use as the modifying polymer is a product of Exxon Chemical Company that is sold under the designation, Polypropylene 3145. It has a density of about 0.910 gram per cubic centimeter when measured in accordance with ASTM D 792. It has a melt flow rate, obtained in accordance with ASTM D 1238, Condition L, of about 300 grams per 10 minutes. It has a number average molecular weight (Mn) of about 43,580, a weight average molecular weight (Mw) of about 124,400, a Z average molecular weight (Mz) of about 255,600, and a polydispersity (Mw/Mn) of about 2.85.

Another commercially available polypropylene that is expected to be suitable for use as the modifying polymer is available from The Himont Corporation under the trade designation PC-973.

Typical characteristics of the Himont PC-973 polypropylene, as stated by Himont, include a density of about 0.900 gram per cubic centimeter measured in accordance with ASTM D 792 and a melt flow rate obtained in accordance with ASTM D 1238, Condition L, of about 35 grams per 10 minutes. Other characteristics of the PC-973 are a tensile strength of about 4,300 pounds per square inch (psi) measured in accordance with ASTM D 638; a flex modulus of about 182,000 psi measured in accordance with ASTM D 790,B and a Rockwell hardness, R scale, of about 93 measured in accordance with ASTM D 785A. The PC-973 is believed to have a number average molecular weight (Mn) of about 40,100, a weight average molecular weight (Mw) of about 172,000 and a Z average weight (Mz) of about 674,000. The polydispersity (Mw/Mn) of the PC-973 is about 4.29.

Another group of modifying polymeric materials that may be used are the KRATON block copolymers developed by Shell Chemical Company. These are generally ABA' type block polymers. They are generally typified by relatively high viscosity, and for that reason may be useful in connection with copolymers made of ethylene and vinyl acetate having high melt index numbers and correspondingly low viscosities at the die head in the melt-blowing process.

A representative KRATON block copolymer might well be one of the S—EB—S type, standing for polystyrene/poly(ethylene-butylene)/polystyrene. Such block copolymers are available under the trademark KRATON G, for example KRATON G 1650, KRATON G 1652, and KRATON GX 1657, from Shell Chemical Company. KRATON rubber materials are described in detail in a number of Shell Chemical Company publications including one designated SC: 198-83, 7/83 5M. KRATON G 1650 rubber has a weight ratio of polystyrene A and A' endblocks to poly(ethylene-butylene) B midblocks of 28:72; for KRATON G 1652 rubber the weight ratio is 29:71, and for KRATON GX 1657 the weight ratio is 14:86. For example, with respect to the KRATON GX 1657 the sum of the molecular weight of A with the molecular weight of A' is 14% of the molecular weight of the A—B—A' block copolymer.

These block copolymers are not believed to contain plasticizer oils, although they are commercially available in compounded form. The G 1650 and G 1652 block copolymers are available in crumb form and have a specific gravity of 0.91 and a Shore A hardness of 75. The GX 1657 block copolymer is available in pellet form, has a specific gravity of 0.90 and a Shore A hardness of 65. KRATON G materials are considered to be satisfactory as modifying polymers.

Other elastomeric resins which may be suitable as modifying polymers in forming the elastomeric webs of the present invention are A—B—A' block copolymers where A and A' are polystyrene endblocks, as defined above, and B is a polybutadiene midblock.

This material is sometimes referred to as an S—B—S block copolymer and is also available from Shell Chemical Company, under the trade designation KRATON D; for example, KRATON D 1101; KRATON D 1102, and KRATON D 1116. According to the Shell Chemical Company publications noted above, KRATON D 1101 rubber has a weight ratio of polystyrene A and A' endblocks to the polybutadiene B midblock of 31:69; for KRATON D 1102 rubber the weight ratio is 28:72; for KRATON D 1116 rubber it is 21:79. For example, with respect to the KRATON D 1116 material the sum of the molecular weight of A with the molecular weight of A' is 21% of the molecular weight of the A—B—A' block copolymer. These block copolymers are available as porous pellets, have a specific gravity of 0.94 and a Shore A hardness of 71 for the D 1101 and D 1102 block copolymers and 65 for the D 1116 block copolymer.

Another S—B—S block copolymer material is commercially available under the trade designation Solprene 418 from the Phillips Petroleum Company.

Yet other elastomeric resins which are considered to be useful as modifying polymers for the copolymers used in forming the elastomeric web of the present invention are A—B—A' block copolymers where A and A' are polystyrene endblocks, as defined above, and B is a polyisoprene midblock.

These block copolymers are sometimes referred to as S—I—S block copolymers and are also available from the Shell Chemical Company under the trade designation KRATON D, for example, KRATON D 1107, KRATON D 1111, KRATON D 1112, and KRATON D 1117. The KRATON D 2207, D 1111, D 1112 and D 1117 block copolymers have respective weight ratios of polystyrene A and A' endblocks to the B midblock of 14:86 (D 1107); 21:79 (D 1111); 14:86 (D 1112), and 17:83 D 1117). For example, with respect to the KRATON D 1117, the sum of the molecular weight of A with the molecular weight of A' is 17% of the molecular weight of the A—B—A' block copolymer. The D 1111 grade is available as a porous pellet having a specific gravity of 0.93 and a Shore A hardness of 52.

Further, the S—EB—S block copolymers, when used as modifying polymers, may be blended with polyolefins, e.g., polyethylene and/or polypropylene. The polyolefin which is utilized in blending the S—EB—S block copolymers must be one which, when blended with the S—EB—S block copolymer, and the copolymer made of ethylene with vinyl acetate, and subjected to an appropriate combination of elevated pressure and elevated temperature conditions, is extrudable in blended form with the block copolymer.

Whether the elastic web comprises a fibrous elastic web, such as, for example, a nonwoven web of melt-blown fibers, or a web of melt-blown primary fibers containing other secondary fibers or particulates which were incorporated into the web during its formation by, for example, utilization of the teachings disclosed in U.S. Pat. No. 4,100,324, it should have sufficient elasticity and be bondable to the facing web or webs of the composite structure of the invention with sufficient strength to form a composite material which may be stretched slightly. The composite should thus provide a desired degree of elasticty.

Although some of the elastomeric EVA microfibers may be somewhat tacky, they do not generally exhibit a high degree of adhesion to many materials, unless heated to the softening point. Accordingly, heat or other types of conventional bonding techniques should preferably be utilized when such webs are to be utilized in forming composites in accordance with the present invention.

It will be appreciated that a degree of elasticity is one important consideration in forming composite fabrics such as those of the present invention, particularly when such composites are to be utilized in garments which are designed to conform to the body of the wearer. For example, in the manufacture of disposable diapers a degree of elasticity of the fabric will assist in conforming it to the body contours of the wearer. Further, it is often desired that the composite material should have a soft hand and feels so it is therefore desirable that the bonding of the elastic web to the other web or webs of the laminate be done without the provision of an adhesive which would tend to make the resultant composite stiff.

Because the elastic web may be bonded to a nonelastic material, by which is meant generally any suitable material which lacks the characteristics of an elastic as defined above, the nonelastic material tends to have a limiting effect on the degree of stretch of the elastic web. In the case of the embodiment of the invention where the elastic web is bonded, while in stretched condition, to two gatherable facing webs, one on each side of the elastic web, the gatherable webs may have some limiting effect on both the extent of stretch and on the degree of recovery of the elastic web in its composite form.

For example, if the elastic web is stretched to an elongation of 100 percent, i.e., to twice its relaxed length, and then bonded to a gatherable nonelastic web such as a nonwoven polyolefin fiber web, upon release of the stretching force action on the composite web, the nonelastic web tends to prevent the elastic web from retracting fully to its original length. This requires that the elastic limit of the elastic web be greater than the desired minimum elastic limit of the composite material.

For example, if it is desired to prepare a composite material stretchable to 100% elongation, a 100 cm length of elastic web may be stretched to a length of, for example, 220 cm (120% elongation) and bonded at spaced-apart locations to a 220 cm length of nonelastic material. The bonded composite elastic material is then allowed to relax and even if the elastic web is capable of recovering to its original 100 cm length, the nonelastic web bonded thereto will inhibit full recovery and the composite may relax to a length of, say, 100 cm. Puckers or gathers will form in the gatherable web between the bond points. The resulting 100 cm length of composite material is stretchable to its 220 cm length to provide a 120% elongatable composite material. The original length of the nonelastic web limits, in this hypothetical example, the attainable elongation of the composite material because the nonelastic web would act as a "stop" to prevent further or excessive stretching of the elastic web under the effect of stretching forces which are less than the failure strength of the nonelastic gathered web.

The elastic web may be bonded to the facing web, which may be a gatherable web, by any suitable means, such as, for example, thermal bonding or ultrasonic welding, which will so ten at least portions of at least one of the webs, usually the elastic web, because the elastomeric materials used for forming the elastic web have lower softening points than many of the materials commonly employed to form the facing webs. Of course, in the case where the facing web is formed from a woven material such as, for example, cotton or a polyester-cotton blend, the woven fabric may have no softening point at all, or none within a practical range, so that for either thermal bonding or ultrasonic welding the bonding process must depend upon the characteristics of the elastic web. Thus, effectuating the bonding by applying heat and pressure to the overlaid elastic and facing webs will soften at least portions of the elastic web by heating these portions (or the entire elastic web) to at least its softening temperature and applying sufficient pressure to form a reasonably strong and permanent bond between the resolidified softened portions of the elastic web and the gatherable web.

One difficulty with such bonding of nonwoven elastomeric webs is that the low basis weight of such webs renders them susceptible to losing their ability to contract to their pretensioned, that is, prestretched, dimensions if they are subjected, even briefly, to being heated while stretched and allowed to cool in the stretched condition. For example, the elastic nonwoven webs of the present invention may have a basis weight ranging from about 15 grams per square meter to about 300 grams per square meter, preferably from about 15 grams per square meter to about 200 grams per square meter, for example from about 15 grams per square meter to about 100 grams per square meter. Although low basis weight elastic webs are preferred largely for economic reasons, particularly for use in disposable articles, the elastic webs may have basis weights considerably higher than 300 gm/m$^2$, for example, up to about 750 gm/m$^2$ or even higher.

A distinct advantage of the present invention is the ability to attain the elastic characteristics in the composite web by bonding a low basis weight, highly elastic web to a facing web, which may be a gatherable nonelastic material that may be of greater tensile strength than the elastic web. In the case of a dilaminate or a trilaminate made by passing the elastic web and either one or two facing layers of spun-bonded or melt-blown fibers formed into a nonwoven, essentially nonelastic web, bonding can be accomplished simply by passing the laminae together through a pair of rolls, at least one of which may be heated. In the case where the elastic web is stretched and then spot-bonded at spaced locations to the elastic web, immediate relaxation of the composite and thus of the elastic web after the bonding step allows the elastic web to contract and then cool while relaxed, enabling it to gather the gatherable web so that the composite web possesses elastic properties without rupturing the gatherable webs because the gatherable webs are able to extend and retract with the elastic web as a result of the presence of the gathers.

The tensile strength of the finished composite web is in most cases largely determined by the usually stronger nonelastic facing web or webs. Naturally, in the case where the facing web or webs are gathered, the elastic web must be sufficiently strong to enable it to gather the gatherable web or webs to which it is bonded and, generally, the stiffer the gatherable web or webs are, the stronger must be the recovering force of the elastic web or webs.

As used herein and in the claims, a "gatherable" web is one which can be gathered into pleats, loops or the like by contraction of the elastic web or webs bonded to it.

One or more elastic webs may be heat-bonded to one or more gatherable webs, for example, essentially nonelastic nonwoven webs, by the application of heat and pressure by passing the overlaid webs, with the elastic web being in a stretched, that is elongated, condition, through the nip of a bonder arrangement. At least one of the rolls of the bonder arrangement should be heated to impart the requisite bonding temperature to at least the bond sites of one or more of the webs to be bonded. In many cases, the elastic web or webs have softening temperatures which are lower than those of the gatherable web or webs to which the elastic web(s) are to be bonded and, consequently, the elastic web(s) may be the only web(s) which are significantly softened in the bonding step. In other cases, the gatherable web(s) may similarly be softened. Accordingly, the elastic web(s), or the gatherable web(s), or both, are thus heated to above the softening temperature of the elastic web, at least at the bond sites therebetween.

The heat for bonding the laminae in making a composite may be applied by the rolls of the bonder arrangement or by another heat source such as a heat source positioned just ahead of the bonder arrangement. However, excellent bonding and an attractive pattern and texture of the composite elastic material are attained by utilizing pattern bonding in which the overlaid elastic and facing web or webs are passed through the nip of a bonder arrangement comprising an anvil roll and a calender roll having a repeating embossing pattern formed thereon. The anvil roll may be smooth or may contain a pattern such as one which is the complementary negative of a positive pattern on the calender roll and one or both of the calender and anvil rolls may be heated. One skilled in the art will appreciate that the temperature to which the webs or at least the bond sites are heated will depend not only on the temperature of the heated roll(s) or other heat source but on the residence time of the webs on the heated roll(s) or adjacent the other heat source, the contact pressure, the basis weights of the webs and their specific heats and thermal conductivities. For a given combination of webs, the processing conditions necessary to effectuate satisfactory bonding can readily be determined by one skilled in the art.

As to the bonding pressure utilized in cases where the bonding is effectuated by passing the overlaid webs through the pressure nip of a bonder arrangement having a pair of rolls which form a nip, specification of the overall pressure loading along the nip does not, in itself, take into account complicating factors such as the effects of pressure roll construction, e.g., roll diameters, materials, and embossing patterns, if any, on the nip width and pressure distribution through the nip. Nonetheless, one skilled in the art, taking into account the overall pressure loading along the nip, the materials of construction of the pressure rolls, the pressure roll diameters and the geometry of embossing patterns, if any, on the rolls, will readily be able to select an effective bonding pressure.

Generally, in the case where two nonwoven facing webs are bonded on each side of an elastic web, the bonding will take place over the complete surface area of each of the two surfaces of the elastic web, that is, no embossing pattern will be used. However, for some purposes, especially, for example, for garments where warmth is a consideration and trapped air between layers is useful, an embossing pattern of bonding may be desirable.

The facing webs preferably are formed from spun-bonded or melt-blown polymeric materials. Among the preferred polymeric materials are spun-bonded or melt-blown nonwoven webs made of LLD polyethylene, high density polyethylene, polypropylene, or a random copolymer of ethylene and propylene. Generally, spun-bonded fibers will be used where greater strength is needed, and melt-blown fibers are often used where strength is not as important as some other characteristic, such as softness.

When the facing web or webs of the composite are a gatherable web or webs to which one or more of the elastic webs are bonded, each gatherable web may be elastic or, more usually, may comprise one or more nonelastic webs. Generally, elastic fibrous webs have a rubbery feel and in applications where the feel of the composite material is of importance, a nonelastic web such as a bonded carded nonelastic polyester fiber web, or nonelastic spun-bonded polypropylene fiber nonwoven web, a spun-bonded nonelastic polyester or polyethylene nonelastic fiber web, nonelastic cellulosic fiber webs, e.g., cotton fiber webs, polyamide fiber webs, e.g, nylon 6—6 webs sold under the trademark Cerex by Monsanto, and blends of two or more of the foregoing, may be utilized.

The production of spun-bonded nonwoven webs is illustrated in U.S. Pat. No. 4,340,563, issued July 20, 1982 to David W. Appel et al., the disclosure of which has been incorporated by reference herein. Generally, in the spun-bonding process a thermoplastic material is extruded through a spinnerette and eduction-drawn into filaments to form a coherent web of randomly deposited filaments on a collecting or forming surface.

Generally, woven and nonwoven webs of any textile or other material may be used in forming the facing web or webs.

Relatively inexpensive and attractive composite fabrics with good hand and feel have been attained by bonding to one or both sides of an elastic web made from microfibers of ethylene-vinyl acetate copolymer, a spun-bonded polypropylene fiber web, and single- and multi-layer combinations thereof. Satisfactory results have been attained by pattern-bonding the webs together under heat and pressure to provide a composite material with excellent characteristics and uniform and attractive appearance.

Referring now to FIG. 1 of the drawings, there is schematically illustrated a continuous manufacturing process for heat-bonding gatherable webs, which may be nonelastic webs, to each of the two opposite sides of a stretched elastic web. An elastic web which may comprise a fibrous nonwoven elastic web or elastic film 4 is unwound from a supply roll 2 of such fibrous elastic material and, traveling in the direction indicated by the arrows associated therewith, passes through the nip of an S roll arrangement 5, comprised of stacked rollers 6 and 8, in the reverse-S path indicated by the rotation direction arrows associated with the stacked rollers 6 and 8. From the S roll arrangement, the web 4 passes into the pressure nip of a bonder roll arrangement 9, which is comprised of a patterned calender roll 10 and a smooth anvil roll 12.

A first gatherable web 16 is unwound from a supply roll 14 and a second gatherable web 20 is unrolled from a supply roll 18. The first web 16 and the second web 20 travel in the direction indicated by the arrows associated therewith as the supply rolls 14 and 18 rotate in the directions indicated by the respective arrows associated therewith. The fibrous elastic web 4 is stretched to a desired percent elongation between the S roll arrangement 5 and the pressure nip of the bonder roll arrangement 9. By virtue of the fact that the peripheral linear speed of the rollers 6 and 8 of the S roll arrangement 5 is considered less than the peripheral linear speed of the rolls 10 and 12 of the bonder roll arrangement 9, the web 4 is therefore stretched to a selected percent elongation thereof and maintained in such elongated condition during heat-bonding of the webs 16 and 20 to the web 4 in the bonder roll arrangement 9.

One or both of the patterned calender roll 10 and the smooth anvil roll 12 may be heated and the pressure between these two rolls may be adjusted to provide the desired temperature and bonding pressure to bond the webs 16 and 20 to the stretched elastic web 4 and form the composite elastic material 22.

The composite elastic material 22, upon emerging from the pressure nip of the bonder roll arrangement 9, immediately undergoes a physical change as the elastic web 4 recovers and contracts as it tends to resume its original length. As it contracts, it gathers the attached gatherable webs 16 and 20. The relaxed (or relaxing) composite passes to a holding box 24 wherein it is maintained in its relaxed, contracted state for a length of time sufficient for the fibrous elastic web 4 to cool sufficiently to avoid cooling while it is in a stretched condition (and thereby losing all or a considerable proportion of its ability to contract from the stretched dimensions which it had assumed during bonding).

It has been found that elastic webs, in particular low basis weight elastic webs such as nonwoven fibrous elastic webs, will lose their ability to contract to or return to their original unstretched dimensions if they are maintained under tension at or above their softening temperature for any significant length of time. A brief recovery period in a relaxed, untensioned condition immediately after bonding has been found to be essential to allow the low basis weight elastic web to contract and gather the gatherable webs so that the bonded composite web attains its elasticity.

After a brief untensioned recovery period of, for example, up to about 30 seconds, e.g., about 3 to 20 seconds, in the holding box 24, the composite elastic material 22 is withdrawn and wound on a storage roll (not shown). The provision of the holding box 24 or equivalent means allows the untensioned heat-bonded composite elastic material to stabilize while it is untensioned.

The successful heat-bonding of an elastic web to one or more nonelastic webs requires that the temperature of the elastic web be raised at least to its softening point and preferably somewhat higher than its softening point. With the elastic webs that are disclosed in this application as being useful in connection with the invention, the softening point has no single fixed value because blends may be used as well as unblended copolymer resin. Generally, however, a temperature of about 65° C. is sufficient for softening of the elastic web sufficiently to cause it to become bonded to a confronting, adjacent web, under the pressure that is applied during passage between the bonder rolls or between the calender roll 10 and the anvil roll 12. If a modifying polymer is present in the elastic web, and has a substantially higher melting point than the copolymer, then it is a simple matter to adjust the temperature applied to raise it sufficiently to obtain adequate bonding. Generally, good heat bonding is obtained at temperatures somewhat above the softening point of the elastic web, and temperatures approaching the melting point may be used in some cases.

Thus, where the calender roll 10 is embossed so as to impose a pattern on the composite, and the temperature and pressure are sufficiently great that the fine fibers of the elastic web are softened to the extent that they may be melted and may be forced from the areas of the elastic web which are compressed by the raised portions of the embossing pattern, a pattern of fine holes may be produced in the elastic web. If the temperature and pressure of embossing are not such that the fine holes are formed, the elastic web will usually be, as a result of its softening during embossing, indented in the area of embossing. In cases where holes are present in the elastic web, the peripheries of the holes in the elastic web appear to be formed of resolidified or otherwise condensed portions of the material of the elastic web, and these portions normally are well bonded to the facing web or webs.

Figure 2:
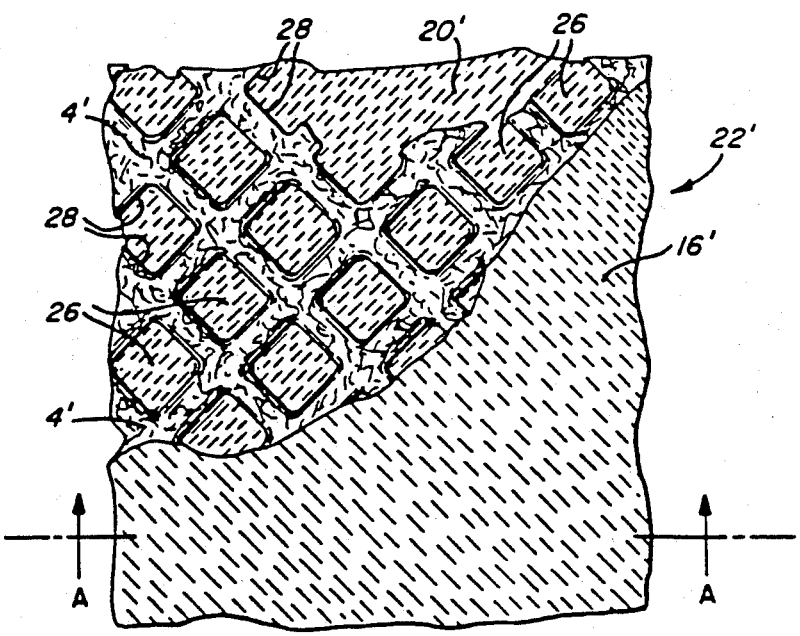
FIG. 2 is a schematic plan view with parts broken away of one embodiment of a composite elastic material in accordance with the present invention, shown in a stretched condition.
Figure 2A:
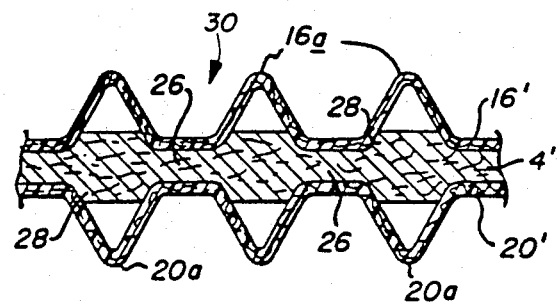
FIG. 2A is a section view along line A—A of FIG. 2, but with the composite elastic material in a relaxed condition relative to its condition in FIG. 2.

With reference to FIGS. 2 and 2A there is shown (schematically and not necessarily to scale, including relative thicknesses of the layers and size of the embossed areas or indentations 30) a composite material 22' made by passing overlain webs 16', 4', and 20', respectively, through the pressure nip between the calender roll 10 and the anvil roll 12. The composite material 22' shown is comprised of a first gatherable web 16' and a second gatherable web 20' heat-bonded to the respective opposite sides of a fibrous elastic web 4' The bond sites are spaced apart, resulting in gathers or pleats 16a and 20a (FIG. 2A) being formed in the gatherable webs 16' and 20' when the composite material 22' is in a relaxed condition as shown in FIG. 2A. The gathers 16a and 30a are not shown in FIG. 2 in order that the drawing be suggestive of the appearance of the composite material 22' in its stretched condition. The fibrous elastic web 4' has a plurality of embossed areas 26 formed therein corresponding to the raised portions of a repeating square- or diamond-shaped embossing pattern on the calender roll 10.

The peripheral portions 28 of the indentations 30 of the web 4' illustrated in FIG. 2A include a resolidified portion of the material which was formerly located in the indented area 30 of the fibrous elastic web 4'. The peripheral portions 28, upon resolidification after softening or melting in the pressure nip of the calender roll 10 and anvil roll 12, tend to form a strong bond with the overlaid gatherable webs 16' and 20'. In examining samples of the elastic composite, the indentations 30 became visible only after peeling away one of the gatherable webs 16' or 20'. In several situations, peeling away of one or more of the gatherable webs revealed that holes had been formed through the elastic web in the embossed areas 26. However, it is possible that a thin layer in a highly indented area of the elastic web 4', within the area of the hole, was stripped away with the gatherable web upon the peeling away of the gatherable web from the elastic web. That is, the holes may have been formed as a result of the stripping-away step as opposed to the embossing step. Particularly with heavier basis weight elastic webs, the embossing may result in a waffle-like pattern in which indentations as opposed to holes are present in the elastic web.

The preferred kind of elastic web for use in the present invention is a coherent nonwoven elastic web formed of elastomeric microfibers in accordance with my copending patent application entitled "Ethylene-Vinyl Copolymers And Methods For Their Formation Into Elastomeric Fibrous Products", U.S. Ser. No. 25,557, filed 3-13-87. That application, which is incorporated herein by reference, describes the production of melt-blown microfibers and coherent nonwoven webs made from these microfibers. The microfibers are formed from certain copolymers and blends of these copolymers with one or more modifying polymers that adjust viscosity or other microfiber properties, or nonwoven web properties.

The useful copolymers disclosed in my copending application are those of ethylene with at least one other vinyl monomer selected from the group consisting of vinyl ester monomers and unsaturated aliphatic monocarboxylic acids and alkyl esters of these monocarboxylic acids, where the amount of monomer other than ethylene in the copolymer is sufficient to impart elasticity to a coherent nonwoven web formed from the melt-blown fibers. The preferred copolymers are those made of ethylene and vinyl acetate (EVA) having a melt index in the range from 32 to 50 (preferably 300) at 190° C. and comprising from 10% by weight to 50% by weight, and preferably 18% by weight to 36% by weight, of vinyl acetate.

The EVA copolymer is preferably used as is, unmodified, to develop the greatest amount of elasticity in the plastic web. However it may be formed with another polymeric material, to produce an extrudable blend that can be melt-blown to form microfibers of desired properties and characteristics. Thus, an extrudable composition can be prepared from at least about 10% by weight, and preferably 50% by weight or more, of the copolymer made of ethylene and at least one other vinyl monomer as described above, and at least one different modifying polymer. The modifying polymer must be compatible, that is, it and the copolymer must have similar rheological behavior, they must form a homogeneous melt, and after being blown into fibers and solidifying, must form a homogeneous solid product. Such a modifying polymer may be used in an amount greater than 0% by weight up to about 90% by weight, but preferably not in excess of 50% by weight, of the melt-blown fibers. The blend is prepared simply by blending pellets of the copolymer and of the modifying polymer, mixing them, and then subjecting the mixture to an effective combination of elevated temperature and elevated pressure conditions, extruding and melt-blowing to form microfibers.

Whether the microfibers for the elastic web are made from unblended copolymer or from a copolymer blended with one or more modifying polymers, the microfibers are susceptible to coforming. While a variety of different coforming techniques are known, one suitable process is that disclosed in U.S. Pat. No. 3,959,421, which is incorporated herein by reference. In an example of such coforming, wood pulp fibers are blown into the melt-blown fibers while the melt-blown fibers remain tacky or molten. The wood pulp fibers become incorporated into the microfibers, and in the nonwoven web that is formed from the collected microfibers, the wood pulp fibers are substantially uniformly distributed. They impart to the elastic nonwoven coherent web their own properties of absorbency and bulk. They also represent an inexpensive component relative to the polymeric components.

Copolymers of ethylene with vinyl acetate that are characterized by a relatively low melt index have relatively high viscosities, and the converse is true, that is, an EVA copolymer having a melt index of 500 at 190° C. may have an extremely low viscosity to the point where it is very difficult to process. There are two ways to ameliorate this situation and improve processability. One way is to blend the EVA copolymer with a modifying polymer that increases viscosity without destroying elastomeric characteristics. The other way is to limit such high melt index polymers to those having a vinyl acetate content not in excess of about 33% by weight.

Where a modifying polymer is used, it is preferably selected from the group consisting of the polymers of ethylene, propylene, butene, styrene, and copolymers and compatible mixtures of these polymers and copolymers, and ABA' block copolymers, where A and A' are each independently a thermoplastic endblock that includes a styrenic moiety and where B is an elastomeric poly(ethylene-butene) midblock.

Webs formed from microfibers of such materials are tactically acceptable, soft, and cloth-like elastomeric nonwoven fabrics. In one preferred embodiment, the microfibers are formed from an extrudable composition that is a mixture of a copolymer made of ethylene and vinyl acetate, along with one or more modifying polyolefins, in minor amount. The polyolefin or polyolefins modify the hand, so that a web of such material is tactically acceptable, and at the same time, the polyolefin or polyolefins may be present in an amount that does not adversely affect the strength and stretch properties.

Ordinarily, microfibers made from the copolymers or copolymer blends described above may be sufficiently tacky when collected, and in such entangled form, that a coherent web is readily formed. Generally, however, tensile strength is improved simply by running the web through the nip of a pair of rolls, to compress the web. The compaction may increase the frictional resistance to movement of the microfibers relative to each other in the web, and thus increase its tensile strength.

Generally, those coherent nonwoven elastomeric webs that are made in accordance with my copending application, and that are useful in the context of the present invention, are those where the microfibers have an average diameter of not greater than about 100 microns, and preferably less than 20 microns, and where the nonwoven webs have an average basis weight of not more than about 300 grams per square meter, and preferably less. Thus, an average basis weight of from about one ounce per square yard to about 10 ounces per square yard is often preferred, depending upon the end use intended for the composite made from the elastomeric web.

When the elastic web is made substantially entirely from a copolymer of ethylene with vinyl acetate in accordance with the preferred embodiment of the invention, that is, from such a copolymer having a melt index in the range from 32 to about 300 at 190° C. and comprising from 10% by weight to about 50% by weight of vinyl acetate, and from microfibers formed predominantly from such a copolymer and collected as a coherent nonwoven elastomeric web, that web ordinarily will possess the requisite elasticity for use in "gatherable" facing web embodiment of the present invention. When the elastic web is formed from a blend of a suitable copolymer in connection with a modifying polymer, the requisite elasticity of the web is one of the factors that must be kept in mind in formulating the blend. Preferably, the EVA copolymer should amount to at least 50% or more by weight of the web in order to impart desirable elasticity. The remainder of the weight of the web may be taken up by a modifying polymer or by one or more secondary fibers.

Leaving aside for present purposes the secondary fibers, as to the polymeric materials in a blend from which the elastic web is formed, the modifying polymer ordinarily will contribute an amount not greater than about 50% by weight, and preferably not greater than about 40% by weight, of the web. When a secondary coforming fiber is to be used, generally it will not be present in an amount in excess of about 55% by weight of the elastic web, and preferably less, and care must be taken in selecting the polymeric material from which the web is made, to achieve the requisite elasticity.

The invention is useful in the production of soft, cloth-like materials that are suitable, for example, as body side covers for diapers, health care, tissue, and industrial products. In preferred embodiments, the cloth-like material is a composite made up as a laminate of one or two gatherable layers from spun-bonded polyolefin fibers that have been formed into coherent nonwoven fibrous webs. Preferred polyolefins for this purpose are polyethylene and polypropylene. Composites prepared in this way possess such properties as strength, drape, and stretch.

Composites in accordance with the invention may also be made from coherent nonwoven webs formed from melt-blown polyolefin fibers that are used as the facing webs. Since polypropylene structures tend to be stiffer than those containing polyethylene, where drape and hand are important, the facing webs ordinarily will be made from polyethylene or from polyethylene blended with a small amount of another polyolefin such as, for example, polypropylene. Where other composite characteristics such as strength and stiffness are important, then the facing webs may be made from spun-bonded or melt-blown polypropylene. Nonwoven webs formed from high density polyethylene, and from random copolymers of ethylene and propylene, are also useful.

A composite made from two gatherable webs that are coherent, nonwoven, nonelastic webs formed from melt-blown or spun-bonded polyethylene fibers, heat-bonded to each side of a coherent nonwoven elastic web formed from a suitable EVA copolymer, provides good cloth-like tactile acceptability and is superior in terms of drape, softness, and strength, to composites generally available.

The following composites, reported in tabular fashion in Table I, have been made. In this table, the composites described were formed from one elastic web, intercalated between two coherent nonwoven webs of spun-bonded fibers. The figures in the table represent percentages by weight of the elastic web for the respective materials. The abbreviations used in the table are as follows:

PE = polyethylene
EVA = ethylene-vinyl acetate copolymer
PP = polypropylene
Pulp = wood pulp fiber
SB = spun-bonded fiber
MB = melt-blown microfibers

TABLE I

| Inelastic Nonwoven Spun-Bonded Facing Web | Intercalary Elastic Web | Inelastic Nonwoven Spun-Bonded Facing Web |
|---|---|---|
| PE | EVA | PE |
| PE | 90 EVA - 10 PE | PE |
| PE | 70 EVA - 30 PE | PE |
| PE | 70 EVA - 30 PE - Pulp | PE |
| PE | 75 EVA - 25 PE | PE |
| PE | 80 EVA - 20 PP | PE |
| PE | 60 EVA - 40 PP | PE |
| PE | 65 EVA - 35 Pulp | PE |
| PE | 45 EVA - 55 Pulp | PE |
| PE | EVA | PP |
| PE | 45 EVA - 55 Pulp | PP |
| PE | 65 EVA - 35 Pulp | PP |
| PE | 90 EVA - 10 PE | PP |
| PE | 75 EVA - 25 PE | PP |
| PE | 45 EVA - 55 Pulp | PP |
| PP | 65 EVA - 35 Pulp | PP |
| PP | 90 EVA - 10 PE | PP |
| PP | 75 EVA - 25 PE | PP |
| PP/PE | 60 EVA - 40 PP | PP/PE |
| PP/PE | 80 EVA - 20 PP | PP/PE |
| PP/PE | EVA | PP/PE |

Each of these composites was soft and cloth-like. Each composite possessed desirable properties of strength, drape and stretch. Each appeared to be an excellent material for use in fabricating diapers, tissues, particularly high wet strength tissues, health care products, and disposable protective drapes and clothing for use, for example, in the operating room. Each of these composites exhibited good absorbency for both oil and water, and the composites made with an elastic web including coformed wood fiber pulp had particularly high absorbency. Generally, the presence of one or more polypropylene facing webs imparted some stiffness, while those composites made with an elastic web having a very high content of ethylene-vinyl acetate copolymer and nonwoven polyethylene fiber facing webs tended to exhibit cloth-like softness as well as good drape and strength.

The EVA copolymer used in forming the trilaminates described above was a commercially available product sold by Exxon Chemical Company under the trademark and grade designation, M-11948-077-004. This resin had a nominal melt index of 200 at 190° C., and an actual melt index of about 160. Its density was 0.950 grams per cc, and the vinyl acetate content was 28.0% by weight.

Similar good results can be expected to be obtained from the use of other EVA copolymers in the production of the nonwoven intercalary web. Preferred EVA copolymers include those having a nominal melt index in the range from 50 to 200 at 190° C., with a vinyl acetate content of 18% by weight to 36% by weight.

Also preferred are those EVA copolymers having a nominal melt index in the range from 150 to 200 at 190° C., with a vinyl acetate content in the range from 26% by weight to 30% by weight.

The polyethylene and polypropylene resins that are employed in producing the facing webs can readily be selected by those skilled in the art from among many that are available commercially. A preferred polyethylene resin is that previously identified and sold by Exxon Chemical Company under the designation LPX 61. A preferred polypropylene resin, also sold by Exxon Chemical Company, carries the designation Polypropylene 3415. It also has been previously described.

In a further demonstration of the invention, two trilaminate composites were prepared. The intercalary layer was a nonwoven web of an EVA copolymer having a nominal melt index of 200 at 190° C. and a vinyl acetate content of 28% by weight. The two facing sheets were nonwoven webs of melt-blown polypropylene. The polypropylene was the Exxon product previously described, designated as Polypropylene 3145.

The three nonwoven webs were drawn off supply rolls, placed in juxtaposition, and passed through the nip of a calender roll that was heated sufficiently to cause enough softening of the intercalary layer so that upon discharge from the calender roll and cooling, the three nonwoven webs were bonded together in face-to-face relationship. The properties of the composites produced in this way are summarized below, the two different runs being designated as Runs A and B in Table II below:

TABLE II

| Trilaminate Composites PP/EVA/PP | | |
|---|---|---|
| | Run A | Run B |
| Basis weight, oz/yd$^2$ | 0.58 | 0.47 |
| Bulk, inches | 0.015 | 0.009 |
| Grab, lb. | | |
| MD | 0.9 | 1.0 |
| CD | 1.2 | 1.0 |
| Peak Energy, in lb. | 1.1 | 0.96 |
| | 1.3 | 1.2 |
| Frazier, ft$^3$/min/ft$^2$ | 295 | 277 |
| Peak Strain, % | | |
| MD | 68 | 53 |
| CD | 66 | 69 |
| Tear, lbs. | | |
| MD | 0.24 | 0.21 |
| CD | 0.28 | 0.22 |
| Absorbency | | |
| H$_2$O, % | 321 | 409 |
| Oil, % | 874 | 864 |

These composites had properties of value in several applications, for example, in protective covers, diapers, and upholstery fabrics. The absorbency of both oil and water was good, indicating promise for the health care area.

The particular temperature and pressure applied at the nip to unite the laminates will depend upon the characteristics of the facing sheets as well as of the intercalary layer. Representative temperature and pressure for a typical bonder set would be about 125° F. and 30 psig.

Other trilaminate composites that have been prepared are summarized in tabular form in Table III below. The EVA intercalary layer functions as an adhesive as well as an elastic layer in these composites.

TABLE III

| Other Composites |
|---|
| 1. SB PP/ MB EVA |
| 2. SB PE/ MB EVA 4.4 oz/yd$^2$/ SP PE |
| 3. SB PP/ MB EVA 4.4 oz/yd$^2$/ SB PE |
| 4. SB PE/ MB 90 EVA/ 10 PE 2 oz/yd$^2$/ SB PE |
| 5. SB PC/ MB 90 EVA/ 10 PE 1 oz/yd$^2$/ SB PE |
| 6. SB PE/ MB 70 EVA/ 30 PE/ SB PE |
| 7. SB PE/ MB 70 EVA/ 30 PE/ SB PE plus pulp |
| 8. SB PE/ MB 80 EVA/ 20 PP/ SB PE |

Specimen 1 in Table III is a dilaminate composite. The remaining specimens are trilaminate composites. In this table, the abbreviation "SB" refers to the fact that the nonwoven web used as the facing sheet was formed from spun-bonded fiber. The abbreviation "MB" used for the intercalary layer refers to the fact that the nonwoven intercalary web was a nonwoven web of melt-blown microfibers. The resins used in making the composites in Table III are identified by abbreviations as "PP", "PE", or "EVA". The "PP" abbreviation refers to Exxon Chemical's Polypropylene 3415. The "PE" abbreviation refers to Exxon Chemical's Polyethylene designated as LPX 61. These two polyolefin resins were previously described in detail. The "EVA" abbreviation refers to another product of Exxon Chemical, a poly(ethylene-vinyl acetate) having a nominal melt index of 200 at 190° C. and a vinyl acetate content of 28% by weight. In specimens 4 through 8 inclusive, the intercalary layer microfibers were formed from a blend of the EVA resin with a polyolefin modifying resin. The numerals in Table III represent the respective percentages by weight in the blend. The basis weight for the intercalary layer is reported in specimens 2 through 5 inclusive.

In specimen 7, a coformed intercalary layer was used, where wood pulp fibers were coformed with the resin blend microfibers. The percentage by weight of wood pulp was not recorded.

These composites have properties that indicate potential applications in the health care area, for the fabrication of disposable diapers, for infant care products, and in connection with carpet and upholstery adhesive backing. The fact that these composites can be made from a spectrum of different intercalary layers and facing sheets, each having its own individual characteristics, makes them exceptionally useful in tailoring properties to particular applications. For example, for a disposable diaper, the facing sheet intended to be in contact with the skin could be made from spun-bonded or melt-blown polyethylene microfibers. However, the facing sheet intended to be in contact with the air, and possessing somewhat more stiffness, abrasion resistance, and strength, could well be formed from spun-bonded polypropylene fibers.

Other similar composites can be made up. Preferably, the facing sheets are formed from polyethylene, polypropylene, blends of these polyolefins, or from a random copolymer of propylene with ethylene. Such random copolymers are currently commercially available with ethylene contents in the range from about 3% by weight to about 5% by weight. However, ethylene contents of up to about 7% by weight are feasible, and the random copolymers produced from this kind of blend are expected to be useful in making spun-bonded fiber facing sheets.

Generally, composites that are trilaminates can be fabricated to have great commercial utility. Such trilaminate composites may be designated, for convenience, as "SMS" composites. The "SMS" abbreviation refers to the fact that the preferred composites are formed with an intercalary layer formed of melt-blown microfibers in the form of a nonwoven web, and the two facing sheets are nonwoven webs of spun-bonded fibers. Generally, the intercalary layer will be formed from an unblended poly(ethylene-vinyl acetate), or from a blend of poly(ethylene-vinyl acetate) with polyethylene, polypropylene, a blend of these, or a random copolymer of ethylene and propylene of the kind previously described. For many possible applications, it is expected that an intercalary layer would be preferred that is made from a nonwoven web of microfibers melt-blown from a blend of 60% by weight of poly(ethylene-vinyl acetate) together with 40% by weight of a modifying polymer that is a polyolefin of the kind mentioned above.

For certain health care applications, a particular kind of composite seems to have great promise. In hospitals, packing gowns and sterile wraps must be treated to be alcohol-repellent. Ordinarily this treatment is carried out by applying a fluorocarbon in solution in hexanol. With an SMS composite, where the intercalary layer has a high content of poly(ethylene-vinyl acetate), the composite may not accept the treatment. It has been found that a composite, that may be designated as an "S3MS" composite will accept the treatment. Such a composite has, for the intercalary layer, three separately fabricated but united nonwoven webs made of melt-blown microfibers.

An S3MS composite preferably is made on a single machine where five different nonwoven webs can be fabricated successively, one on top of the other. The first such web is a spun-bonded web. The second, third and fourth nonwoven webs are formed from melt-blown microfibers. The fifth web is another facing sheet, and is made from a spun-bonded nonwoven web.

A preferred S3MS composite is one where the two facing sheets are formed from spun-bonded polyolefin fibers. The polyolefin may be, for example, high density polyethylene, low density polyethylene, polypropylene, blends of these materials, or a random copolymer of propylene with 3% by weight to 7% by weight of ethylene. Ordinarily, such random copolymers are formed by a gas phase polymerization.

The three melt-blown nonwoven webs can be designated, for convenience in description, as webs 2, 3 and 4, respectively. Webs 2 and 4 may be melt-blown from a polyolefin. The polyolefin is preferably polypropylene, but may be polyethylene, blends of polyethylene and polypropylene, or a random copolymer of propylene with 3% by weight to 7% by weight of ethylene. Web 3 is preferably formed from unblended poly(ethylene-vinyl acetate). This EVA copolymer preferably has a nominal melt index of 30 to 500 at 190° C., with a vinyl acetate content of 10% by weight to 50% by weight. A more preferred EVA copolymer is one where the melt index is in the range from 32 to 300. For ease in processing, the nominal melt index is from 50 to 200 at 190° C., with a vinyl acetate content of 18% by weight to 36% by weight. More preferably, the nominal melt index is in the range from 150 to 200 at 190° C., with a vinyl acetate content of 26% by weight to 30% by weight.

While an EVA copolymer is preferred for Web 3, it is possible to use a blend. Also, other ethylene-based copolymers may be used. Thus, the copolymer of Web 3 may be a copolymer of ethylene and at least one other vinyl monomer selected from the group consisting of vinyl ester monomers and unsaturated aliphatic monocarboxylic acids and alkyl esters of aliphatic monocarboxylic acids, wherein the amount of monomer other than the ethylene in the copolymer is sufficient to impart elasticity to microfibers produced by melt-blowing the copolymer.

While the S3MS configuration has properties that make it suitable for a particular purpose, other composite configurations are within the scope of the invention and are contemplated. Generally, the facing sheets will be formed from spun-bonded polyolefin fibers for the properties that nonwoven webs of such fibers provide. However, one or more melt-blown nonwoven webs, or even combinations of melt-blown and spun-bonded nonwoven fiber webs, may be formed for interposition between the facing sheets to develop particular properties. Ideally, such composites would be formed by the in-line, sequential production of the nonwoven webs. Thus, a conveyor belt might be disposed beneath fiber-producing stations that would produce the first web as a facing sheet, then either spun-bonded or melt-blown webs respectively, as many as desired, in sequence, and finally, another facing sheet. These random webs, formed one on top of the other, could be carried by the conveyor belt directly to bonder rolls, for the application of heat and pressure, to unite the several nonwoven webs to form a unitary composite in which the webs are bonded together in face-to-face relation.

However, it would be equally feasible to form the nonwoven webs separately, and then combine them. Economics and the availability of suitable equipment will determine which production technique appears to be the more feasible. The nonwoven webs that are used in such multiple-layer composites can be formed either from single resins, from blends of two resins, from triblends, or from an even greater number of different resins where special properties are desired. Other S3MS composites that are contemplated employ different combinations of nonwoven webs. Some exemplary combinations of the S3MS composites are tabulated in Table IV below. The entries in this table are for Webs 2, 3 and 4 only, it being understood that the facing sheets ordinarily (although not necessarily) are formed from spun-bonded polyolefin fibers.

TABLE IV

| | S3MS Composites | | |
| --- | --- | --- | --- |
| Specimen | Web 2 | Web 3 | Web 4 |
| 1 | PE | EVA | PE |
| 2 | PE | EVA | PP |
| 3 | PP | EVA | PP |
| 4 | PP/PE | EVA | PP/PE |
| 5 | PP/EVA | EVA | PP/EVA |
| 6 | PE/EVA | EVA | PE/EVA |
| 7 | PE/EVA | EVA | PP/EVA |

The abbreviations in this table correspond to those previously used to represent the same materials.

Web 3 ordinarily will be formed from melt-blown microfibers. Webs 2 and 4 may be formed from either melt-blown or spun-bonded fibers, depending upon the needs of a particular application.

These laminates ordinarily are united by passing them through the nip of a bonder set at a temperature of 150° F. to 200° F. and at a pressure of 15 psig to 30 psig. These conditions are exemplary only, and other temperatures and pressures needed for bonding particular composites can easily be developed by those skilled in the art.

Exemplary S3MS composites have been made up using combinations such as those of Table IV above. In some of these demonstrations of the invention, the spun-bonded facing sheets had basis weights of 0.4 ounce per square yard, and 0.8 ounce per square yard. The basis weights for Webs 2, 3 and 4 may be adjusted as desired for particular purposes but may be, for example, in ounces per square yard: 1, 0.75, 0.5, and 0.25.

The invention will be further exemplified by a description of six composites that were made up in accordance with the invention, together with a report on the properties of these composites. Each composite was a trilaminate made in the manner discussed above. In each case, the nonwoven elastic web was formed from melt-blown microfibers of poly(ethylene-vinyl acetate). The ethylene-vinyl acetate copolymer employed had a nominal melt index of 200 at 190° C. and contained 28% by weight of vinyl acetate. The nonwoven elastic web formed from the copolymer microfibers was stretched, then bonded at spaced locations relative to each other, on each of its opposite faces, to a nonwoven inelastic web. The elastic web was then relaxed, whereupon the outer laminae were gathered.

As indicated in Table V below, the inelastic nonwoven web in each case was formed of fibers of polypropylene. As shown in Table V, the inelastic webs were either formed from spun-bonded polypropylene, melt-blown polypropylene, or of polypropylene fibers formed into a bonded carded web.

The six stretchable composites that were made up had the following compositions:

TABLE V

| Stretchable Composites | | |
|---|---|---|
| Nonwoven Elastic Web of Melt-Blown Microfibers of Poly (Ethylene-Vinyl Acetate) | Elastic Web Basis Wt., g/m² | Nonwoven Inelastic Web Laminae Bonded to Opposite Faces of the Elastic Web |
| Specimen | | |
| 1 | 80 | SB[1] PP[2] |
| 2 | 100 | SB PP |
| 3 | 60 | SB PP |
| 4 | 80 | MB[3] PP (BW 20 g/m²) |
| 5 | 80 | BCW[4] of PP |
| 6 | 80 | MB PP (BW 15 g/m²) |

[1]spun-bonded
[2]polypropylene
[3]melt-blown
[4]bonded carded web

Each of these composites was subjected to a series of tests to evaluate the properties of the composites. Before describing the test results, the test protocols will be described. In reporting the results of these tests, at east five observations were made and the values averaged, to obtain the values reported in the tables below.

Drape Stiffness

This test in accordance with FTMS 191 Method 5206 is intended to determine the bonding length and flexural rigidity of a fabric by employing the principle of cantilevered bending of the fabric under its own weight. The value is expressed in centimeters of one-half of the overhang while the fabric is inclined at 41.5 degrees. The lower the value the more drape or less stiff and thus presumably the softer the material is to the hand. Exemplary materials had a drape stiffness as low as 1.87 centimeters in the machine direction. Drape preferably should not exceed 4 cm in either direction, to provide a good subjective hand.

Tensile Strength

Grab tensile strength and elongation measured in accordance with FTMS 191A Method 5100 is a measure of breaking strength and stretch of a fabric when subjected to unidirectional stress. Values for grab tensile and grab stretch are attained using a specified width of fabric, clamp width and constant rate of extension. The sample is wider than the clamp to give results representative of effective strength of fibers in the clamped width combined with additional strength contributed by adjacent fibers in the fabric. This closely simulates fabric stress conditions in actual use. Results are expressed as pounds to break and percent of stretch to break. Total energy can also be expressed as well as energy to break. High numbers indicate strong or stretchable fabric. Minimum acceptable grab tensile peak load is 5 lbs. in either the machine direction, MD, or in the cross direction, CD.

Trap tear as measured in accordance with FTMS 191A Method 5136 is a measure of the force required to propagate a tear across a fabric under constant rate of extension. A specified width of fabric cut on one edge is clamped along the non-parallel sides of a trapezoidal shape drawn on the sample. The same rates of pull s the grab method above are followed. A minimum trap tear peak strength is 3 lbs. in either MD or CD.

The results of these tests on specimens 1–6 inclusive were:

TABLE VI

| Specimen No. | Dir. | Drape Stiffness (cm) | Grab Tensile Peak Load (lbs) | Grab Tensile Peak Elong. (%) | Trap Tear 5 Peaks (lbs) | Trap Tear 1st High (lbs) |
|---|---|---|---|---|---|---|
| 1 | MD | 2.15 | 17.10 | 125.17 | 5.68 | 7.98 |
| 2 | MD | 1.87 | 17.22 | 129.69 | 6.99 | 7.32 |
| 3 | MD | 2.08 | 14.90 | 117.78 | 5.60 | 6.01 |
| 4 | MD | 2.15 | 9.82 | 99.99 | 3.51 | 3.58 |
| 5 | MD | 2.02 | 18.51 | 103.68 | 9.05 | 9.57 |
| 6 | MD | 1.90 | 7.44 | 85.83 | 2.72 | 3.88 |

TABLE VII

| Specimen No. | Dir. | Drape Stiffness (cm) | Grab Tensile Peak Load (lbs) | Grab Tensile Peak Elong. (%) | Trap Tear 5 Peaks (lbs) | Trap Tear 1st High (lbs) |
|---|---|---|---|---|---|---|
| 1 | CD | 3.85 | 18.37 | 59.19 | 7.65 | 7.75 |
| 2 | CD | 3.88 | 19.50 | 61.34 | 9.01 | 9.28 |
| 3 | CD | 3.58 | 16.79 | 53.65 | 8.19 | 8.19 |
| 4 | CD | 4.00 | 7.70 | 66.42 | 1.83 | 2.34 |
| 5 | CD | 3.15 | 7.59 | 142.69 | 3.24 | 3.76 |
| 6 | CD | 3.68 | 6.64 | 77.57 | 2.25 | 2.51 |

The six specimens were further evaluated in terms of thickness or fullness by the Ames bulk test.

Ames Bulk

Bulk is a measure of thickness or fullness. Subjectively, high bulk provides a good hand or cloth-like feel. Ames bulk is a measure of fabric thickness in centimeters, although reported in Table V below in inches. A high bulk fabric feels somewhat cushioned to the touch, and for many applications is desirable. High bulk combined with light weight and good absorbency is particularly important for diapers and similar personal or health care items. For this reason, the absorbency and rate data were determined for both water and oil for the six specimens. The relevant data is reported below in Table VIII except for water rate, which exceeded 60 seconds in every case.

Absorbency

Capacity and rate data for both water and oil give an indication of the absorbency of the materials. The capacity is the amount of liquid absorbed relative to the weight of the material. The rate is the amount of time required for the material to absorb a given amount of liquid. The maximum amount of time allowed is sixty seconds. Preferred minimums for oil and water capacity are 400% and 150, respectively.

TABLE VIII

| Specimen No. | Composite Basis Weight (GSM) | Ames Bulk (in) | Water Capacity (%) | Oil Capacity (%) | Oil Rate (Sec) |
| --- | --- | --- | --- | --- | --- |
| 1 | 148.04 | 0.072 | 176 | 394 | 1.70 |
| 2 | 145.87 | 0.076 | 155 | 402 | 1.50 |
| 3 | 120.57 | 0.070 | 151 | 455 | 1.58 |
| 4 | 158.49 | 0.078 | 155 | 506 | 2.70 |
| 5 | 126.67 | 0.080 | 277 | 410 | 1.52 |
| 6 | 137.05 | 0.062 | 159 | 474 | 2.67 |

The six specimens prepared and evaluated have properties that render them eminently suitable for use in a variety of garments including undergarments, menstrual and incontinence control articles, and garments such as disposal diapers and the like.

To further exemplify the invention, a series of tests may be run in which gatherable webs of different materials are heat-bonded to a nonwoven elastic web comprising melt-blown microfibers of a blend of 90 parts by weight of a copolymer made of ethylene and vinyl acetate having a nominal melt index of 190 at 190° C. and a vinyl acetate content of 28% by weight, with 10 parts by weight of linear low density polyethylene, such as the LPX 61 polyethylene described above.

The runs may be carried out in apparatus of the type schematically illustrated in FIG. 1 comprising a bonder arrangement (corresponding to 9 in FIG. 1) having a 14 inch (35.6 cm) wide bonding surface provided by a nominal 7 inch (17.8 cm) diameter, smooth stainless steel anvil roller (corresponding to 12 in FIG. 1) and a nominal 7 inch (17.8 cm) diameter stainless steel calender roller (corresponding to 10 in FIG. 1) having thereon a raised diamond embossing pattern comprises of squares both diagonally aligned and diagonally oriented relative to the machine direction of the web. The embossing pattern may be comprised of lands raised 0.09 inch (0.229 cm) above the roller base surface, each land being a square having sides 1/16 of an inch (0.159 cm) long with the facing sides of adjacent squares being ⅛ of an inch (0.318 cm) apart as measured perpendicularly to and between adjacent sides.

The calender and anvil rollers may be independently oil-heated, with an S roll (corresponding to 5 in FIG. 1) and suitable feed rolls (corresponding to 2, 14 and 18 in FIG. 1) to feed the webs to the bonder roll at controlled speeds. When composite elastic materials are made in which only one side of the fibrous elastic web is laminated to a gatherable web, the supply roll corresponding to supply roll 18 of FIG. 1 may be eliminated so that the gatherable web passes over the embossing calender roll 10 and the fibrous elastic web passes over the smooth anvil roll 12 as illustrated in the schematic representation of FIG. 1. Both the embossing calender roll 10 and smooth anvil roll 12 may be heated to the temperatures indicated below. The net force urging the anvil roll 12 and the calender roll 10 toward each other in the runs described below should be, preferably, on the order of about 3,400 pounds (1,542 Kg) plus or minus about 10%. The elastic web width may be about 12 inches (30.5 cm) wide before elongation and can be expected to be from about 10 TM inches (26.7 cm) wide at about 25% elongation to about 7 inches (17.8 cm) wide at about 550% elongation.

A series of runs may be carried out to produce composite elastic materials having elongations of approximately 25%, 50%, 75% and 100% before failing. "Failure" is defined as occurring at the "ultimate elongation" of a composite material, which is the elongation at which the material tears or otherwise fails. Elongation may be tested in an Instron testing device.

For this testing purpose, a 2 inch by 5 inch rectangle of the material should be cut with the 5 inch long sides being substantially parallel to the machine direction of the web of composite material from which the sample is cut. The 2 inch sides are then clamped in the jaws of a properly calibrated Instron testing device. It is then attempted to elongate each sample in two stages, with one minute's rest between stages, to elongations of 50% and then 100%, after which the sample is relaxed to zero elongation. If the sample fails during either of these two stages, the percent elongation at failure is the "ultimate elongation". If the sample does not fail during either of these two stages, then after being relaxed to zero elongation, it is stretched at 10 feet per minute until it fails, the percent elongation at break or tear being the "ultimate elongation".

The desired or target elongation of 25%, 50%, etc., of the composite elastic material should not be confused with the definition given above of an elastic material as one which is in itself (not the composite) capable of at least 25% elongation and a stated degree of recovery. The stiffness, basis weight and bonding pattern of the gatherable web or webs bonded to the elastic web or webs in a composite material can be controlled in order to affect (reduce) the degree of elongation of the composite material. For example, composite materials of considerably less than 100% elongation are often desired for certain end uses.

Representative composite elastic materials for such testing purposes may be made by utilizing a fibrous elastic web of the same 90 EVA copolymer—10 polyethylene LPX 61 blend described above, and bonding to each side of the fibrous elastic web either a 22 grams per square yard poly(ethylene terephthalate) bonded carded web material made by Carolina Formed Fabrics or a one ounce per square yard spun-bonded poly(ethylene terephthalate) fiber web sold by E. I. du Pont de Nemours and Company under the registered trademark REEMAY. The elasticity observations expected would be in the range from about 25% to about 200% elongation.

The necessity of allowing the composite web to relax immediately after bonding can be demonstrated by two comparative test runs, in which similar conditions are maintained except for the omission of the relaxation step in one run. For these two runs, a 22 grams per square yard thermally-bonded poly(ethylene terephthalate)

fiber nonwoven web may be bonded to each side of a nonwoven fibrous web of fibers of the same 90 EVA copolymer—10 polyethylene LPX 61 blend described above, and having a basis weight such as, for example, 60 to 85 g/m².

In one of these two comparative runs, the bonded composite material should be maintained under tension after the bonding step by winding it directly onto a storage roll as the composite material emerges from the bonder rolls, without allowing it to relax. With respect to FIG. 1, the resultant composite web can be expected to have substantially no non-destructive elasticity because its elastic web component, as a result of the fact that the elastic web should have been wound up on the storage roll while in an elongated, tensioned condition, before cooling, and therefore can be expected to have lost its ability to contract and thus form gathers in the gatherable webs. By "non-destructive elasticity" is meant that the composite could be stretched to the desired extent, and then allowed to contract, without rupturing the gatherable webs.

In the second of these two comparative runs, the composite is allowed to run freely off the bonder rolls and the elastic web therefore contracts, forming gathers in the nonelastic web and providing an attractive, elastic composite web. This composite can be expected to be readily stretchable.

The bond strengths of composites made in accordance with the invention are easily measured. For this purpose it is convenient to express the bond strength as the force in grams that is required to peel away a three-inch wide strip of gatherable web from the elastic web to which it has been bonded. One way to make the measurement is as follows. After a composite has been made by bonding a bonded carded web of a polyester fiber on each of the two opposite surfaces of a coherent elastic web made of melt-blown microfibers of a 90/10 blend of EVA copolymer with polyethylene LPX 61 with the polyester webs gathered on the opposite sides of the stretched but relaxed elastic web, specimens may be taken for testing purposes. For example, several specimens may be cut that are three inches wide in the cross-machine direction and seven inches long in the machine direction.

For test purposes, three such specimens may be separated or delaminated in part. Thus, one of the polyester webs may be separated for a distance of approximately one inch along the machine direction of the specimen, and placed in one jaw of an Instron tester. The other two laminae or layers are placed in the opposite jaw of the tester. The tester is then set to move the jaws apart, in such fashion as to exert a force tending to separate the partly separated polyester layer from the partial composite of the elastic web and other polyester layer. The setting may be such, for example, as to move the jaws apart at a rate of about 10 inches or 25.4 cm per minute. It is advisable to take an average of several readings, that is, values obtained with several different specimens, to obtain a representative average value. The value obtained from the test is a force in grams per three inch width of specimen as required to delaminate the one polyester web from the remaining two layers of the composite. A similar test can be run on the other side, to determine if there is any substantial difference in delamination forces required between the two sides (there usually is). Representative values would generally be in the range from about 50 grams to about 300 grams per three inch strip, and more generally from about 75 grams to about 200 grams per three inch strip.

CONCLUSION

Composite gathered elastic materials of the invention are utilizable generally in any article calling for an elastic material such as, but not limited to, stretchable protective covers and wraps, outerwear, undergarments, menstrual and incontinence control articles and garments such as disposable diapers, and the like. Their low cost relative to woven or knitted fabrics permits economic adaptations to "disposable" articles, by which is meant articles intended to be disposed of, rather than laundered and reused, after one or a few uses.

This application is closely related to but represents the disclosure of an improvement over the subject matter of the commonly assigned patent application of Jack D. Taylor and Michael J. Vander Wielen, entitled "Composite Elastomeric Material and Process for Making the Same", U.S. Ser. No. 760,437, filed July 30, 1985 now U.S. Pat. No. 4,720,415. The disclosure of that application is incorporated herein.

The subject matter of this application is also closely related to that of my own copending patent application, entitled "Ethylene-Vinyl Copolymers And Methods For Their Formation Into Elastomeric Fibrous Products", U.S. Ser. No. 25,557, filed Mar. 13, 1987, now U.S. Pat. No. 4,803,117, the subject matter of which is also incorporated herein by reference.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. An elastic composite material comprising at least one elastic web joined at spaced-apart locations to at least one gatherable web, said gatherable web being gathered between said spaced-apart locations, said elastic web comprising a copolymer made of ethylene and from about 10% by weight to about 50% by weight of at least one other vinyl monomer selected from the group consisting of vinyl ester monomers and unsaturated aliphatic monocarboxylic acids and alkyl esters of said monocarboxylic acids.

2. The composite material of claim 1, said composite being made by:
   (a) tensioning said elastic web to elongate it;
   (b) bonding said elastic web to at least one gatherable web under conditions that soften at least portions of said elastic web, to form a bonded composite web, and
   (c) relaxing said composite web immediately after the bonding step whereby said elongated elastic web can contract and the gatherable web is gathered to form said composite elastic material;
   wherein said elastic web further comprises at least 10% by weight of said web of said copolymer and from greater than 0% by weight up to about 90% by weight of at least one other compatible modifying polymer that, when blended with said copolymer and subjected to an effective combination of elevated temperature and elevated pressure conditions, is adapted to be extruded, in blended form, with said copolymer.

3. The composite material of claim 2 wherein said modifying polymer is selected from the group including polyethylene, polypropylene, polybutene, polystyrene, copolymers and mixtures of these, and an ABA' block copolymer, where A and A' are each a thermoplastic polymer endblock that includes a styrenic moiety and where B is an elastomeric poly(ethylene-butene) midblock, and mixtures thereof.

4. The composite material of claim 3 wherein said copolymer is present in an amount sufficient to impart elasticity to a coherent web formed by collecting melt-blown fibers of said composition.

5. The composite material of claim 2 wherein said modifying polymer comprises at least one polymer selected from the group consisting of ethylene, propylene, polybutene, ethylene copolymers, propylene copolymers, and butene copolymers.

6. The composite material of claim 5 wherein said modifying polymer comprises a blend of two or more polymers selected from the group consisting of polyethylene, polypropylene, polybutene, ethylene copolymers, propylene copolymers, and butene copolymers.

7. The composite material of claim 5 wherein said modifying polymer comprises polyethylene.

8. The composite material of claim 5 wherein said modifying polymer comprises polypropylene.

9. The composite material of claim 5 wherein said modifying polymer is polybutene.

10. The composite material of claim 5 wherein said modifying polymer is an isobutylene-butene copolymer.

11. The composite material of claim 1 wherein said elastic web comprises a nonwoven coherent web of melt-blown microfibers.

12. The composite material of claim 5 wherein said elastic web comprises a nonwoven coherent web of melt-blown microfibers.

13. An elastic composite material comprising at least one elastic web joined at spaced-apart locations to at least one gatherable web, said gatherable web being gathered between said spaced-apart locations, said elastic web comprising poly(ethylene-vinyl acetate) having a nominal melt index in the range from 50 to 200 at 190° C. and comprising from 18% by weight to about 36% by weight of vinyl acetate, said composite material being made by
   (a) tensioning said elastic web to elongate it;
   (b) bonding said elastic web to at least one gatherable web under conditions that soften portions of said elastic web at locations that are spaced from each other, to form a bonded composite web, and
   (c) relaxing said composite web immediately after the bonding step whereby said elongated elastic web contract and the gatherable web is gathered to form said composite elastic material.

14. The composite material of claim 13 wherein said elastic web comprises a nonwoven coherent web of melt-blown microfibers.

15. The composite material of claim 14 further comprising secondary fibers intermixed with said melt-blown microfbers.

16. The composite material of claim 14 wherein said melt-blown microfibers are in the form of a nonwoven coherent web that exhibits the ability to be stretched to at least 150% of the web length as formed.

17. The composite material of claim 14 wherein said nonwoven elastomeric web comprises
   (a) microfibers comprising poly(ethylene-vinyl acetate) having a nominal melt index in the range from 32 to 300 at 190° C. and comprising from 18% by weight to about 36% by weight of vinyl acetate; and
   (b) from greater than 0% by weight to about 80% by weight of at least one different secondary fiber that is generally uniformly distributed throughout said nonwoven web.

18. The composite material of claim 17 wherein said secondary fiber comprises a fibrous material selected from the group consisting of wood pulp fiber, staple natural fiber, staple artificial fiber, and mixtures thereof.

19. The composite material of claim 14 wherein said melt-blown fibers are formed form a blend of said poly(ethylene-vinyl acetate) with from greater than 0% by weight up to about 90% by weight of said fibers of at least one other compatible modifying polymer which, when blended with said copolymer and subjected to an effective combination of elevated temperature and elevated pressure conditions, is adapted to be extruded, in blended form, with said copolymer.

20. The composite material of claim 19 wherein said modifying polymer is selected from the group including polyethylene, polypropylene, polybutene, polystyrene, copolymers and mixtures of these, and an ABA' block copolymer, where A and A' are each independently a thermoplastic polymer endblock that includes a styrenic moiety and where B is an elastomeric poly(ethylene-butene) midblock, and mixtures thereof.

21. The composite material of claim 20 wherein said modifying polymer comprises at least one polymer selected from the group consisting of polyethylene, polypropylene, polybutene, ethylene copolymers, propylene copolymers, and butene copolymers.

22. The composite material of claim 21 wherein said modifying polymer comprises a blend of two or more polymers selected from the group consisting of polyethylene, polypropylene, polybutene, ethylene copolymers, propylene copolymers, and butene copolymers.

23. The composite material of claim 14 wherein said elastic web is bonded to the gatherable web at a plurality of spaced-apart locations in a repeating pattern and wherein the gatherable web is gathered between said bonded locations.

24. The composite material of claim 14 wherein said elastic web has a basis weight of up to about 300 grams per square meter.

25. The composite material of claim 13 wherein said gatherable web is a nonwoven coherent nonelastic material and is formed from an interlaced web of fibers selected from the group consisting of polyester fibers, polyolefin fibers, polyamide fibers, cellulosic fibers, and mixtures of two or more thereof.

26. The composite material of claim 25 wherein said gatherable web comprises spun-bonded or melt-brown fibers of polyethylene, polypropylene, a random copolymer of ethylene and propylene, and blends thereof.

27. An elastic composite material comprising at least one elastic web joined at spaced-apart locations to at least one gatherable web, said gatherable web being gathered between said spaced-apart locations, said elastic web comprising poly (ethylene-vinyl acetate) comprising from about 10% by weight to about 50% by weight of vinyl acetate.

28. The composite material of claim 27 wherein said elastic web comprises a nonwoven coherent web of melt-blown microfibers.

29. The composite material of claim 28 further comprising secondary fibers intermixed with said melt-blown microfibers.

30. The composite material of claim 28 wherein said melt-blown microfibers are in the form of a nonwoven coherent web that exhibits the ability to be stretched to at least 150 percent of the web length formed.

31. The composite material of claim 28 wherein said nonwoven elastomeric web comprises
(a) microfibers comprising poly(ethylene-vinyl acetate) having a nominal melt index in the range from 32 to 300 at 190° C. and comprising from 10% by weight to about 50% by weight by weight of vinyl acetate; and
(b) from greater than 0% by weight to about 80% by weight of at least one different secondary fiber that is generally uniformly distributed throughout said nonwoven web.

32. The composite material of claim 31 wherein said secondary fiber comprises a fibrous material selected from the group consisting of wood pulp fiber, staple natural fiber, staple artificial fiber, and mixtures thereof.

33. The composite material of claim 28 wherein said melt-blown fibers are formed from a blend of said poly-(ethylene-vinyl acetate) with from greater than 0% by weight up to about 90% by weight of aid fibers of at least one other compatible modifying polymer which, when blended with said copolymer and subjected to an effective combination of elevated temperature and elevated pressure conditions, is adapted to be extruded, in blended form, with said copolymer.

34. The composite material of claim 33 wherein said modifying polymer is selected from the group including polyethylene, polypropylene, polybutene, polystyrene, copolymers and mixtures of these, and an ABA' block copolymer, where A and A' are each independently a thermoplastic polymer endblock that includes a styrenic moiety and where B is an elastomeric poly(ethylenebutene) midblock, and mixtures thereof.

35. The composite material of claim 34 wherein said modifying polymer comprises a blend of two or more polymers selected from the group consisting of polyethylene, polypropylene, polybutene, ethylene copolymers, propylene copolymers, and butene copolymers.

36. The composite material of claim 28 wherein said elastic web has a basis weight of up to about 300 grams per square meter.

37. The composite material of claim 27 wherein said gatherable web is a nonwoven coherent nonelastic material and is formed form an interlaced web of fibers selected from the group consisting of polyester fibers, polyefin fibers, polyamide fibers, cellulosic fibers, and mixtures of two or more thereof.

38. The composite material of claim 37 wherein said gatherable web comprises spun-bonded or melt-blown fibers of polyethylene, polypropylene, a random copolymer of ethylene and propylene, and blends thereof.

39. An elastic composite material comprising at least one elastic web joined at spaced-apart locations to at least one gatherable web, said gatherable web being gathered between said spaced-apart locations, said elastic web comprising poly (ethylene-vinyl acetate comprising from about 18% by weight to about 36% by weight of vinyl acetate.

40. The composite material of claim 39 wherein said elastic web comprises a nonwoven coherent web of melt-blown microfibers.

41. The composite material of claim 40 further comprising secondary fibers intermixed with said melt-blown microfibers.

42. The composite material of claim 40 wherein said melt-blown microfibers are in the form of a nonwoven coherent web that exhibits the ability to be stretched to at least 150 percent of the web length formed.

43. The composite material of claim 40 wherein said nonwoven elastomeric web comprises
(a) microfibers comprising poly(ethylene-vinyl acetate) having a nominal melt index in the range from 32 to 300 at 190° C. and comprising from 18% by weight to about 36% by weight by weight of vinyl acetate; and
(b) from greater than 0% by weight to about 80% by weight of at least one different secondary fiber that is generally uniformly distributed throughout said nonwoven web.

44. The composite material of claim 43 wherein said secondary fiber comprises a fibrous material selected from the group consisting of wood pulp fiber, staple natural fiber, staple artificial fiber, and mixtures thereof.

45. The composite material of claim 40 wherein said melt-blown fibers are formed from a blend of said poly-(ethylene-vinyl acetate) with from greater than 0% by weight up to about 90% by weight of said fibers of at least one other compatible modifying polymer which, when blended with said copolymer and subjected to an effective combination of elevated temperature and elevated pressure conditions, is adapted to be extruded, in blended form, with said copolymer.

46. The composite material of claim 45 wherein said modifying polymer is selected from the group including polyethylene, polypropylene, polybutene, polystyrene, copolymers and mixtures of these, and ABA' block copolymer, where A and A' are each independently a thermoplastic polymer endblock that includes a styrenic moiety and where B is an elastomeric poly(ethylenebutene) midblock, and mixtures thereof.

47. The composite material of claim 46 wherein said modifying polymer comprises a blend of two or more polymers selected from the group consisting of polyethylene, polypropylene, polybutene, ethylene copolymers, propylene copolymers, and butene copolymers.

48. The composite material of claim 40 wherein said elastic web has a basis weight of up to about 300 grams per square meter.

49. The composite material of claim 39 wherein said gatherable web is a nonwoven coherent nonelastic material and is formed form an interlaced web of fibers selected from the group consisting of polyester fibers, polyolefin fibers, polyamide fibers, cellulosic fibers, and mixtures of two or more thereof.

50. The composite material of claim 49 wherein said gatherable web comprises spun-bonded or melt-blown fibers of polyethylene, polypropylene, a random copolymer of ethylene and propylene, and blends thereof.

51. An elastic composite material comprising at least one elastic web joined at spaced-apart locations to at least one gatherable web, said gatherable web being gathered between said spaced-apart locations, said elastic web comprising poly (ethylene-vinyl acetate) comprising from about 26% by weight to about 30% by weight of vinyl acetate.

52. The composite material of claim 51 wherein said elastic web comprises a nonwoven coherent web of melt-blown microfibers.

53. The composite material of claim 52 further comprising secondary fibers intermixed with said melt-blown microfibers.

54. The composite material of claim 52 wherein said melt-blown microfibers are in the form of a nonwoven coherent web that exhibits the ability to be stretched to at least 150 percent of the web length formed.

55. The composite material of claim 52 wherein said nonwoven elastomeric web comprises
(a) microfibers comprising poly(ethylene-vinyl acetate) having a nominal melt index in the range from 32 to 300 at 190° C. and comprising from 26% by weight to about 30% by weight by weight of vinyl acetate; and
(b) from greater than 0% by weight to about 80% by weight of at least one different secondary fiber that is generally uniformly distributed throughout said nonwoven web.

56. The composite material of claim 55 wherein said secondary fiber comprises a fibrous material selected from the group consisting of wood pulp fiber, staple natural fiber, staple artificial fiber, and mixtures thereof.

57. The composite material of claim 52 wherein said melt-blown fibers are formed from a blend of said poly(ethylene-vinyl acetate) with from greater than 0% by weight up to about 90% by weight of said fibers of at least one other compatible modifying polymer which, when blended with said copolymer and subjected to an effective combination of elevated temperature and elevated pressure conditions, is adapted to be extruded, in blended form, with said copolymer.

58. The composite material of claim 57 wherein said modifying polymer is selected from the group including polyethylene, polypropylene, polybutene, polystyrene, copolymers and mixtures of these, and an ABA' block copolymer, where A and A' are each independently a thermoplastic polymer endblock that includes a styrenic moiety and where B is an elastomeric poly(ethylene-butene) midblock, and mixtures thereof.

59. The composite material of claim 58 wherein said modifying polymer comprises a blend of two or more polymers selected from the group consisting of polyethylene, polypropylene, polybutene, ethylene copolymers, propylene copolymers, and butene copolymers.

60. The composite material of claim 52 wherein said elastic web has a basis weight of up to about 300 grams per square meter.

61. The composite material of claim 51 wherein said gatherable web is a nonwoven coherent nonelastic material and is formed form an interlaced web of fibers selected from the group consisting of polyester fibers, polyolefin fibers, polyamide fibers, cellulosic fibers, and mixtures of two or more thereof.

62. The composite material of claim 61 wherein said gatherable web comprises spun-bonded or melt-blown fibers of polyethylene, polypropylene, a random copolymer of ethylene and propylene, and blends thereof.

63. An elastic composite material comprising at least one elastic web joined at spaced-apart locations to at least one gatherable web, said gatherable web being gathered between said spaced-apart locations, said elastic web comprising poly (ethylene-vinyl acetate) consisting essentially of from about 26% by weight to about 30% by weight of vinyl acetate.

64. The composite material of claim 63 wherein said elastic web comprises a nonwoven coherent web of melt-blown microfibers.

65. The composite material of claim 64 further comprising secondary fibers intermixed with said melt-blown microfibers.

66. The composite material of claim 64 wherein said melt-blown microfibers are in the form of a nonwoven coherent web that exhibits the ability to be stretched to at least 150 percent of the web length formed.

67. The composite material of claim 64 wherein said nonwoven elastomeric web comprises
(a) microfibers comprising poly(ehtylene-vinyl acetate) having a nominal melt index in the range from 32 to 300 at 190° C. and consisting essentially of from about 26% by weight to about 30% by weight by weight of vinyl acetate; and
(b) from greater than 0% by weight to about 80% by weight of at least one different secondary fiber that is generally uniformly distributed throughout said nonwoven web.

68. The composite material of claim 67 wherein said secondary fiber comprises a fibrous material selected from the group consisting of wood pulp fiber, staple natural fiber, staple artificial fiber, and mixtures thereof.

69. The composite material of claim 64 wherein said melt-blown fibers are formed from a blend of said poly(ethylene-vinyl acetate) with from greater than 0% by weight up to about 90% by weight of said fibers of at least one other compatible modifying polymer which, when blended with said copolymer and subjected to an effective combination of elevated temperature and elevated pressure conditions, is adapted to be extruded, in blended form, with said copolymer.

70. The composite material of claim 69 wherein said modifying polymer is selected from the group including polyethylene, polypropylene, polybutene, polystyrene, copolymers and mixtures of these, and an ABA' block copolymer, where A and A' are each independently a thermoplastic polymer endblock that includes a styrenic moiety and where B is an elastomeric poly(ethylene-butene) midblock, and mixtures thereof.

71. The composite material of claim 70 wherein said modifying polymer comprises a blend of two or more polymers selected from the group consisting of polyethylene, polypropylene, polybutene, ethylene copolymers, propylene copolymers, and butene copolymers.

72. The composite material of claim 64 wherein said elastic web has a basis of weight of up to about 300 grams per square meter.

73. The composite material of claim 63 wherein said gatherable web is a nonwoven coherent nonelastic material and is formed form an interlaced web of fibers selected from the group consisting of polyester fibers, polyolefin fibers, polyamide fibers, cellulosic fibers, and mixtures of two or more thereof.

74. The composite material of claim 73 wherein said gatherable web comprises spun-bonded or melt-blown fibers of polyethylene, polypropylene, a random copolymer of ethylene and propylene, and blends thereof.

* * * * *

UNITED STATES PATENT AND TRADEMARK OFFICE
CERTIFICATE OF CORRECTION

PATENT NO. : 4,863,779
DATED : September 5, 1989
INVENTOR(S) : Diego Daponte It is certified that error appears in the above—identified patent and that said Letters Patent is hereby corrected as shown below:

Column 13, line 34, "feels" should read --feel--;

Column 14, line 16, "so ten" should read --soften--;

Column 23, line 23, "juxtraposition" should read --juxtaposition--;

Column 27, line 55, "east" should read --least--;

Column 33, line 53, "contract" should read --can contract--;

Column 34, line 56, "melt-brown" should read --melt-blown--;

Column 35, line 27, "aid" should read --said--;

Column 35, line 53, "polyefin" should read --polyolefin--;

Column 35, line 63, "acetate" should read --acetate)--; and

Column 38, line 51, "basis of weight" should read --basis weight of--.

Signed and Sealed this

Thirteenth Day of April, 1993

*Attest:*

STEPHEN G. KUNIN

*Attesting Officer*  Acting Commissioner of Patents and Trademarks